US012607892B2

(12) United States Patent
Oka et al.

(10) Patent No.: US 12,607,892 B2
(45) Date of Patent: Apr. 21, 2026

(54) LIQUID CRYSTAL OPTICAL ELEMENT

(71) Applicant: Japan Display Inc., Tokyo (JP)

(72) Inventors: Shinichiro Oka, Tokyo (JP); Yasushi Tomioka, Tokyo (JP); Koichi Igeta, Tokyo (JP); Ayaka Higuchi, Tokyo (JP); Tsuyoshi Iyama, Tokyo (JP); Ryoichi Matsumoto, Tokyo (JP); Kiyoshi Shohara, Tokyo (JP); Takeshi Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/826,422

(22) Filed: Sep. 6, 2024

(65) Prior Publication Data

US 2024/0427195 A1     Dec. 26, 2024

Related U.S. Application Data

(63) Continuation of application No. PCT/JP2022/046709, filed on Dec. 19, 2022.

(30) Foreign Application Priority Data

Mar. 9, 2022     (JP) ................................ 2022-036132

(51) Int. Cl.
     *G02F 1/1337*          (2006.01)
(52) U.S. Cl.
     CPC ................................. *G02F 1/1337* (2013.01)
(58) Field of Classification Search
     CPC ................................ G02F 1/1337; G02B 5/18
     See application file for complete search history.

(56) References Cited

U.S. PATENT DOCUMENTS

| | | | |
|---|---|---|---|
| 6,175,398 B1 * | 1/2001 | Yamada | G02F 1/133528 349/96 |
| 8,546,808 B2 * | 10/2013 | Kubo | G02F 1/1393 349/33 |
| 10,942,398 B1 * | 3/2021 | Calafiore | G03F 7/0002 |

(Continued)

FOREIGN PATENT DOCUMENTS

| | | |
|---|---|---|
| JP | 09288206 A | 11/1997 |
| JP | 2011187108 A | 9/2011 |

(Continued)

OTHER PUBLICATIONS

International Search Report issued on Feb. 21, 2023, in corresponding International Application No. PCT/JP2022/046709, 2 pages.

(Continued)

*Primary Examiner* — Kevin Quarterman
(74) *Attorney, Agent, or Firm* — Maier & Maier, PLLC

(57)          ABSTRACT

According to one embodiment, a liquid crystal optical element according to one embodiment includes a substrate, a plurality of structures aligned at a prescribed pitch in each of a plurality of first areas, and a liquid crystal layer arranged across the plurality of first areas and a second area surrounding each of the plurality of first areas. The liquid crystal layer includes first liquid crystal molecules arranged in the first areas between the adjacent structures and aligned along the structures, and second liquid crystal molecules having the long axes aligned in the same direction in the second area.

13 Claims, 16 Drawing Sheets

(56) References Cited

U.S. PATENT DOCUMENTS

| | | | |
|---|---|---|---|
| 2009/0322970 A1 | 12/2009 | Iwane | |
| 2010/0260030 A1* | 10/2010 | Tao ..................... | G02B 5/1828 |
| 2011/0216255 A1 | 9/2011 | Miyauchi et al. | |
| 2016/0033698 A1 | 2/2016 | Escuti et al. | |
| 2019/0317352 A1 | 10/2019 | Saitoh et al. | |
| 2021/0191169 A1 | 6/2021 | Sumi et al. | |

FOREIGN PATENT DOCUMENTS

| | | |
|---|---|---|
| JP | 2017522601 A | 8/2017 |
| JP | 2018067607 A | 4/2018 |
| WO | 2008/004570 A1 | 10/2008 |
| WO | 2018123832 A1 | 7/2018 |
| WO | 2020/004497 A1 | 1/2020 |

OTHER PUBLICATIONS

Office Action issued on Feb. 18, 2025, in corresponding Japanese Application No. 2024-505910, 6 pages.

\* cited by examiner

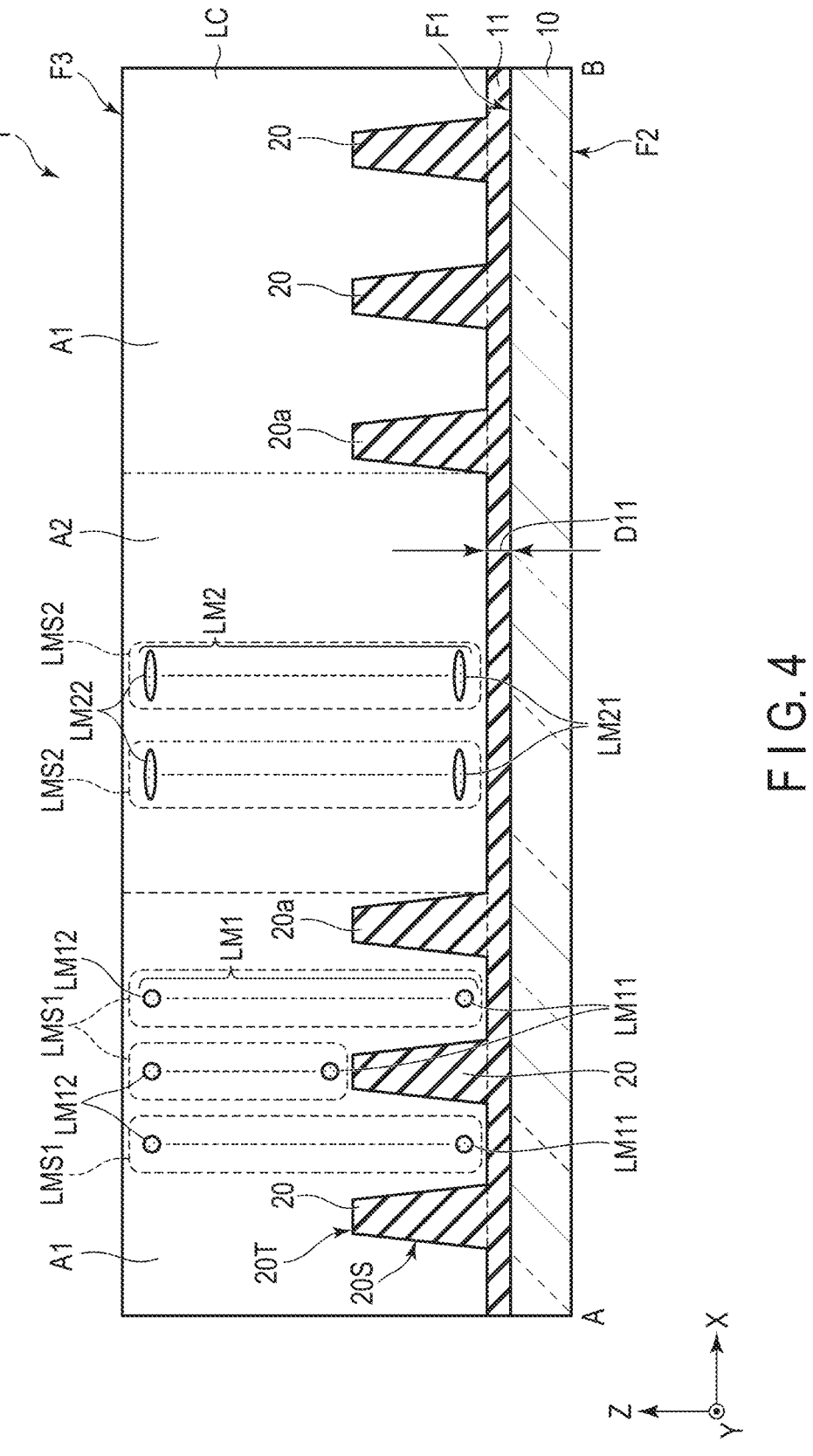
F I G. 4

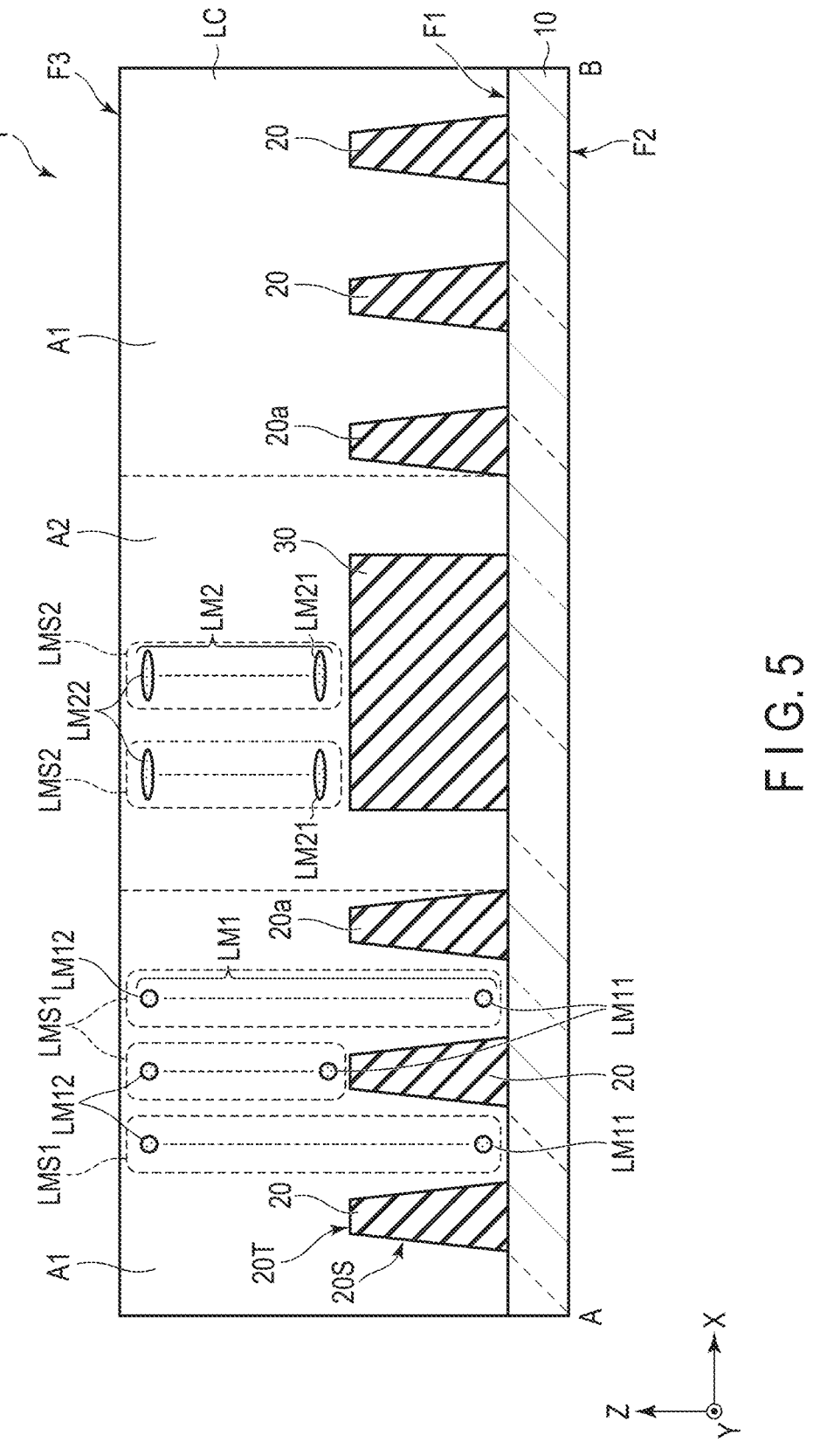
F I G. 5

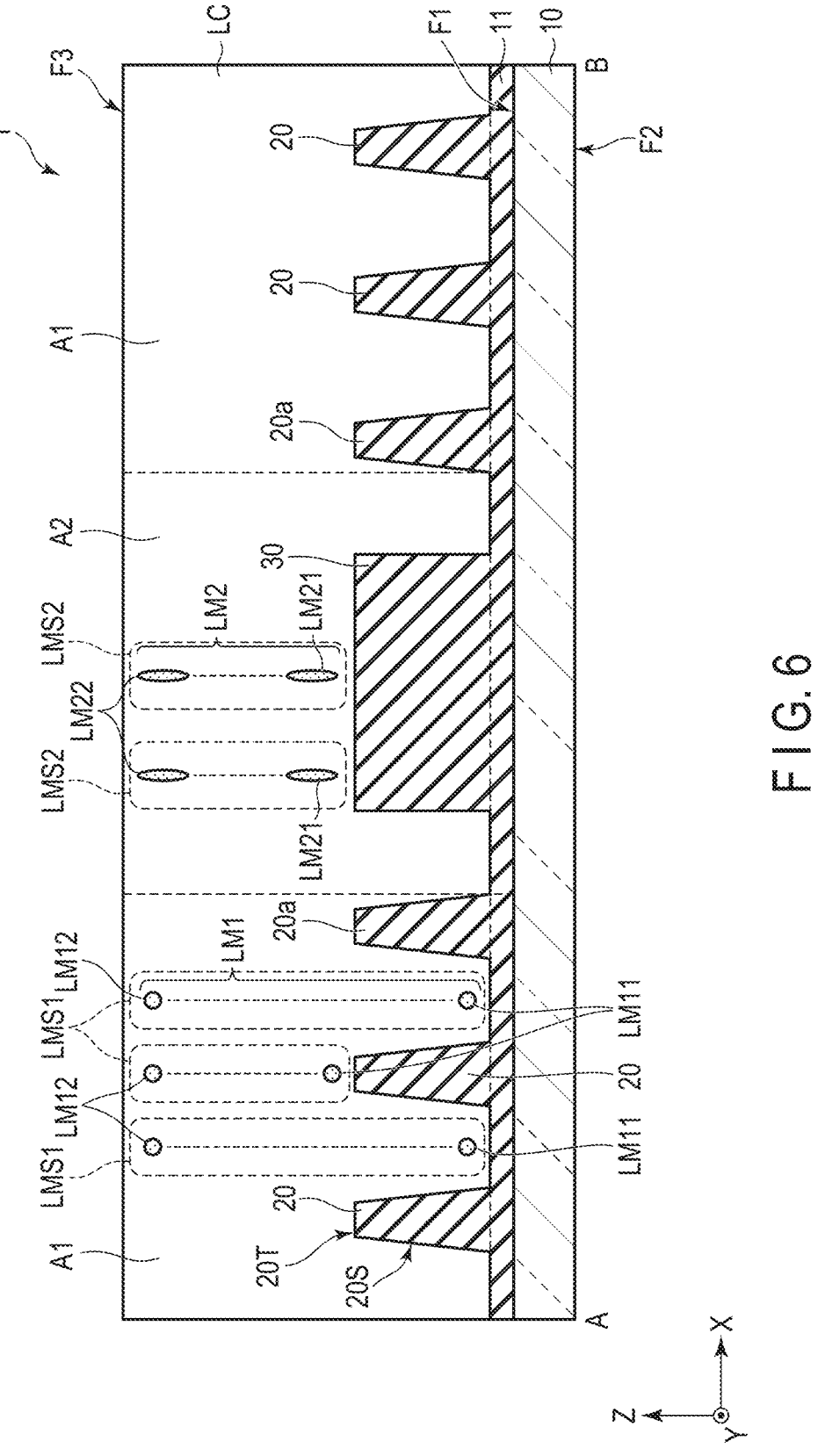
F I G. 6

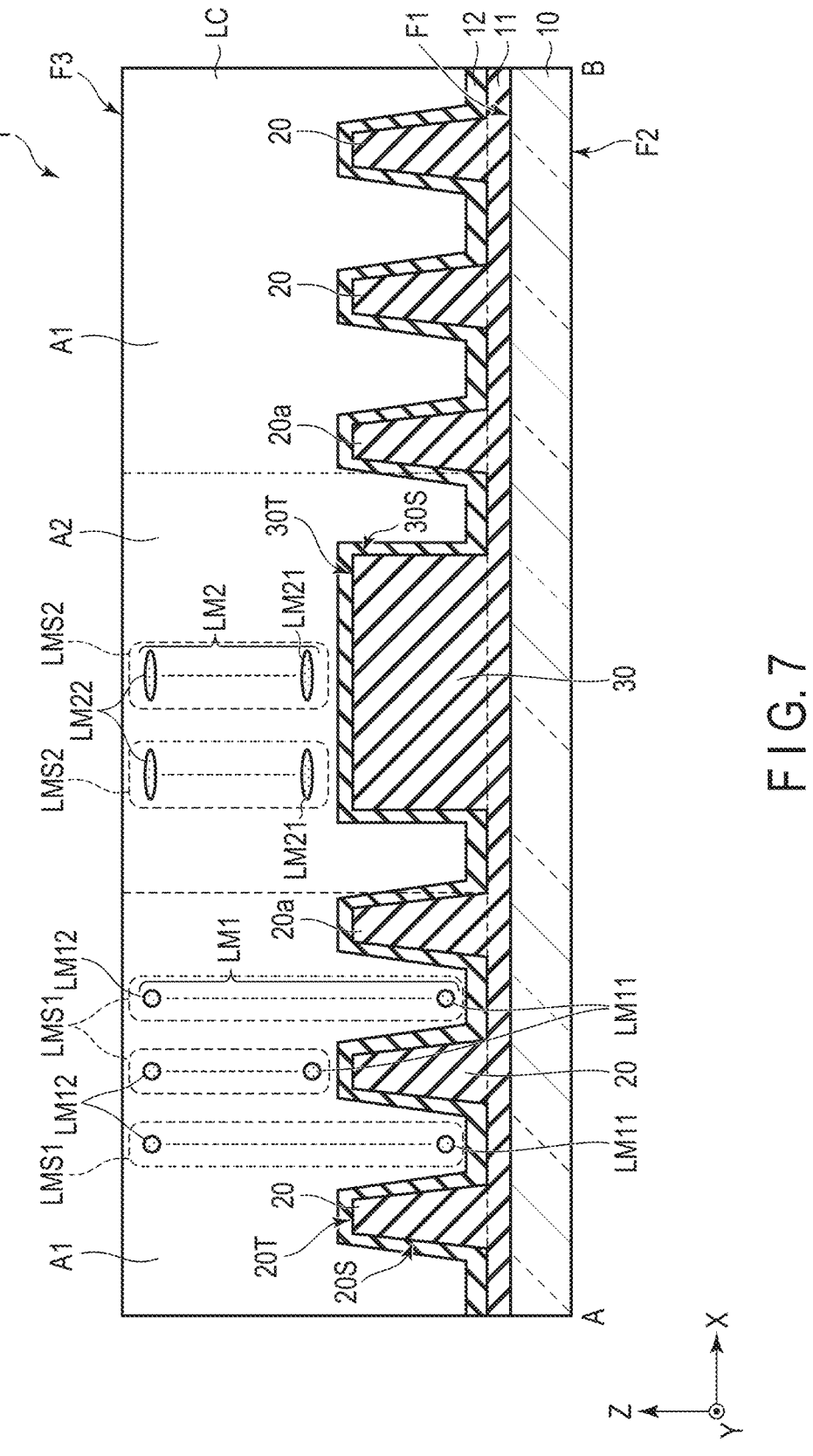
F I G. 7

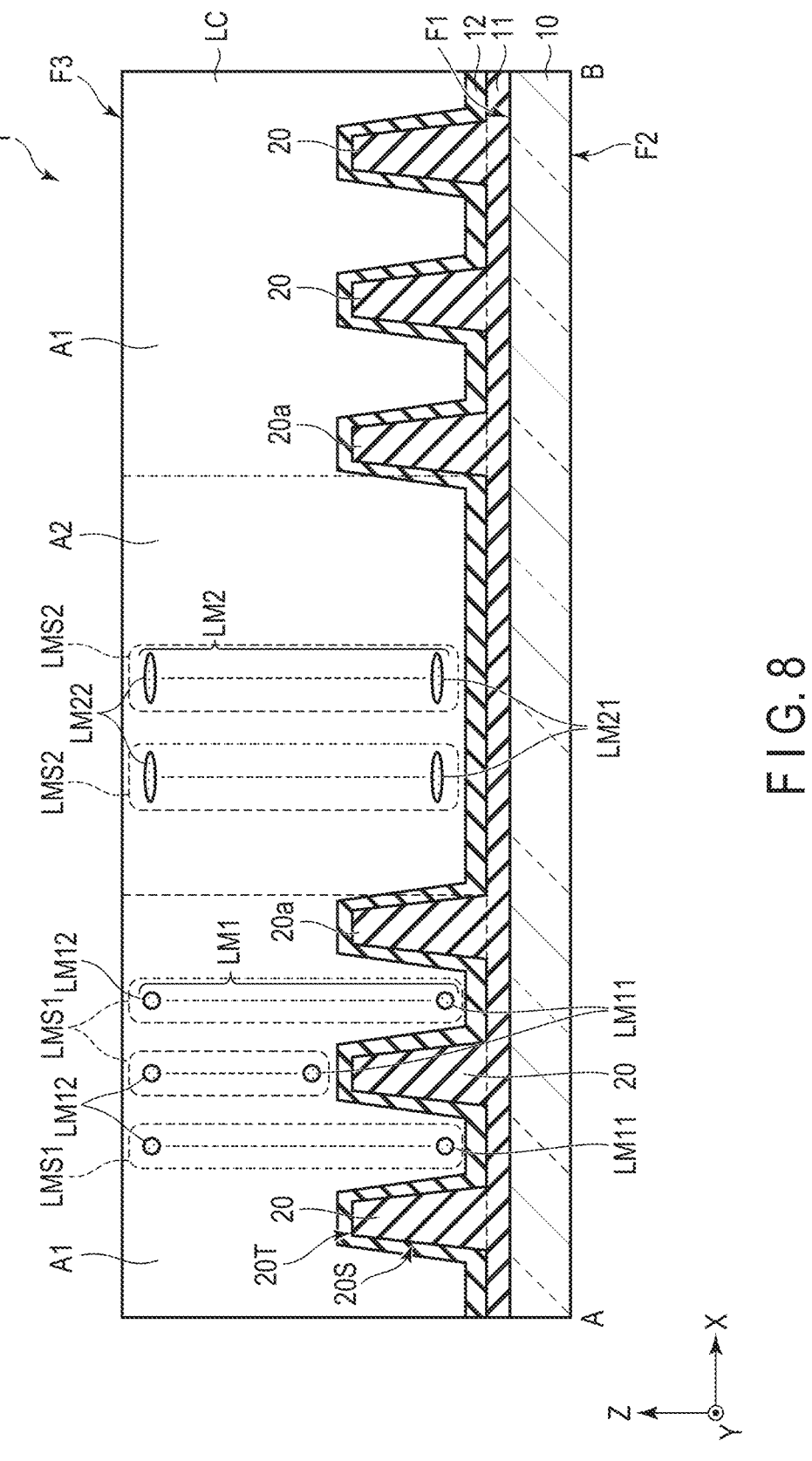
F I G. 8

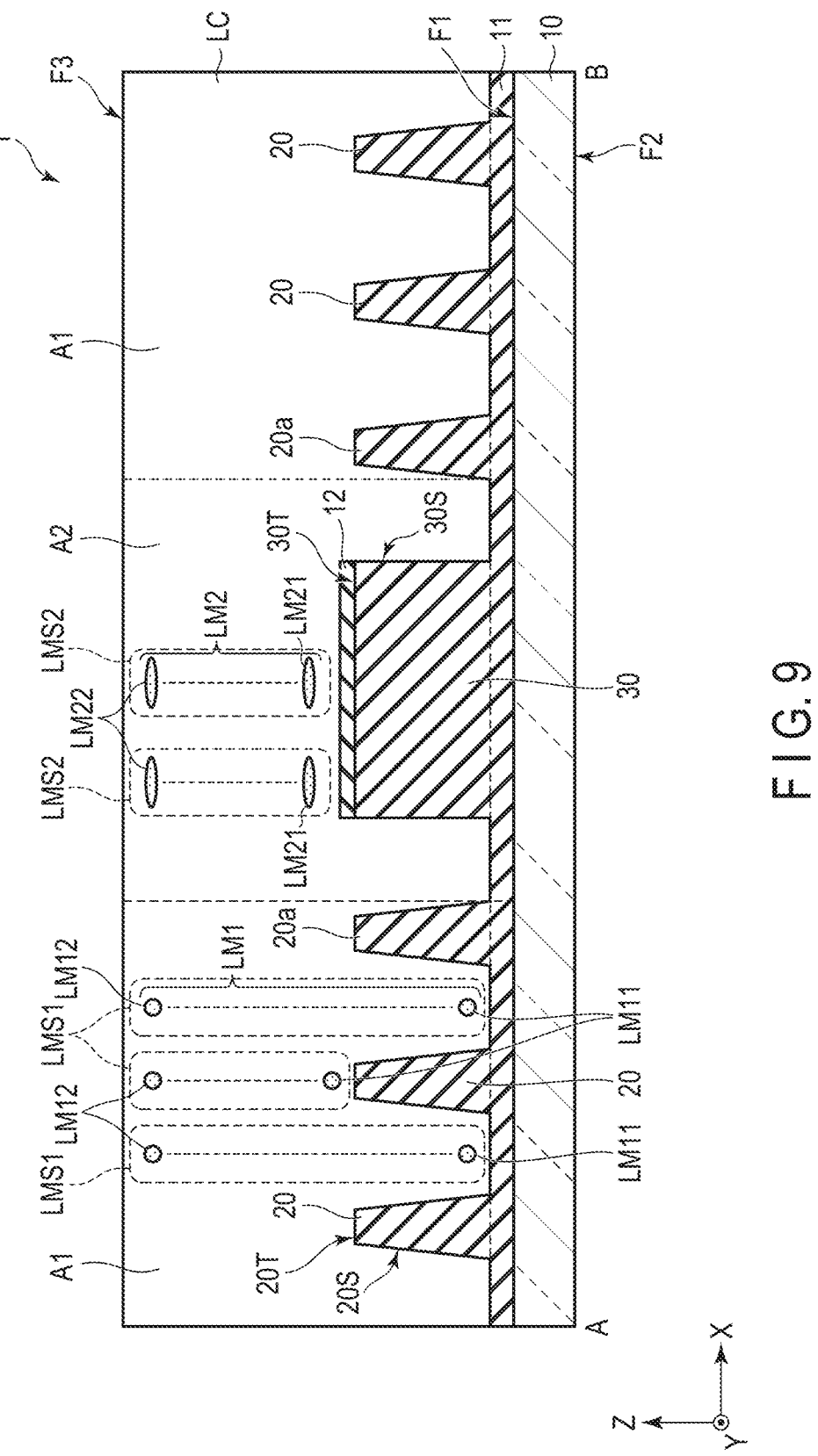
F I G. 9

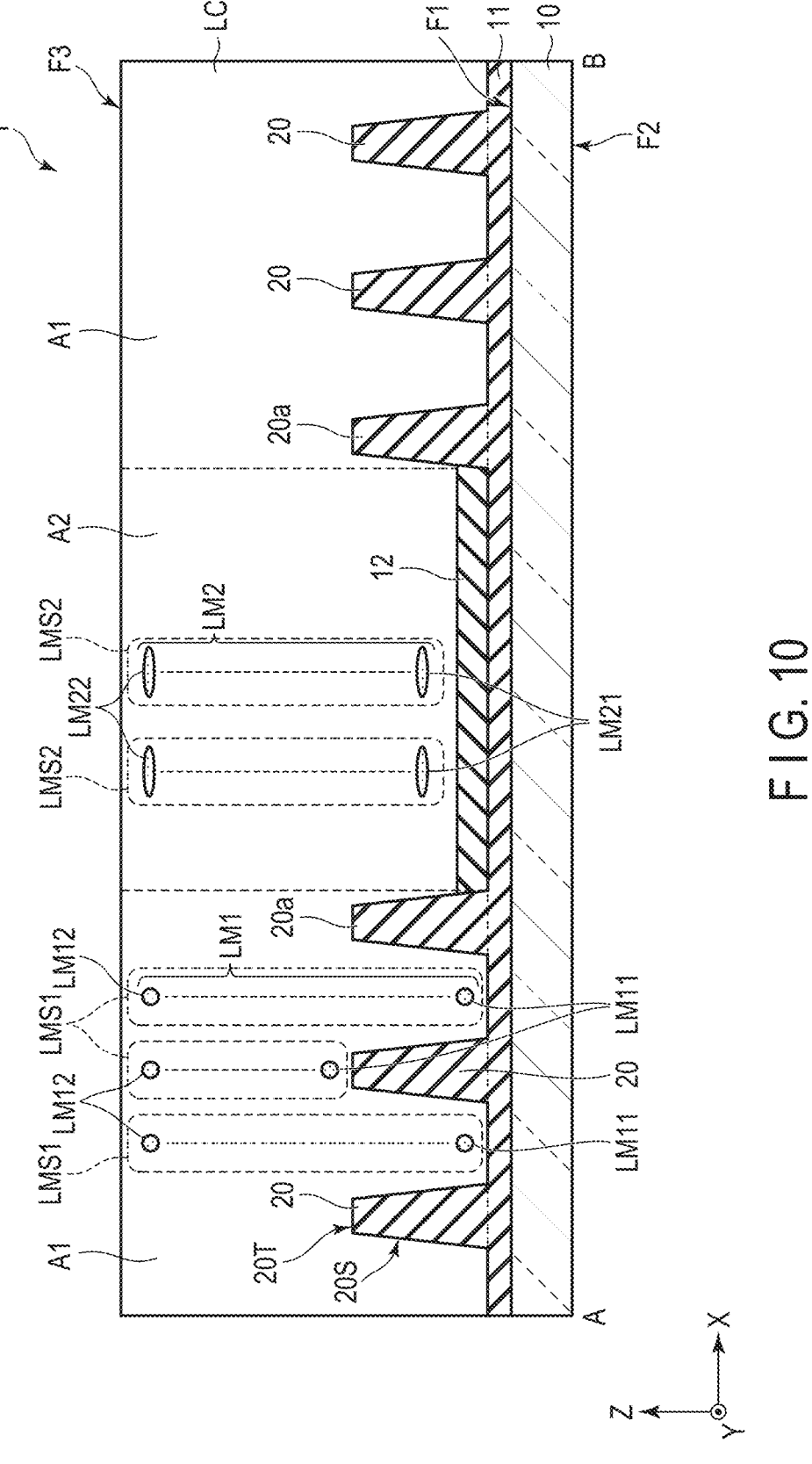
F I G. 10

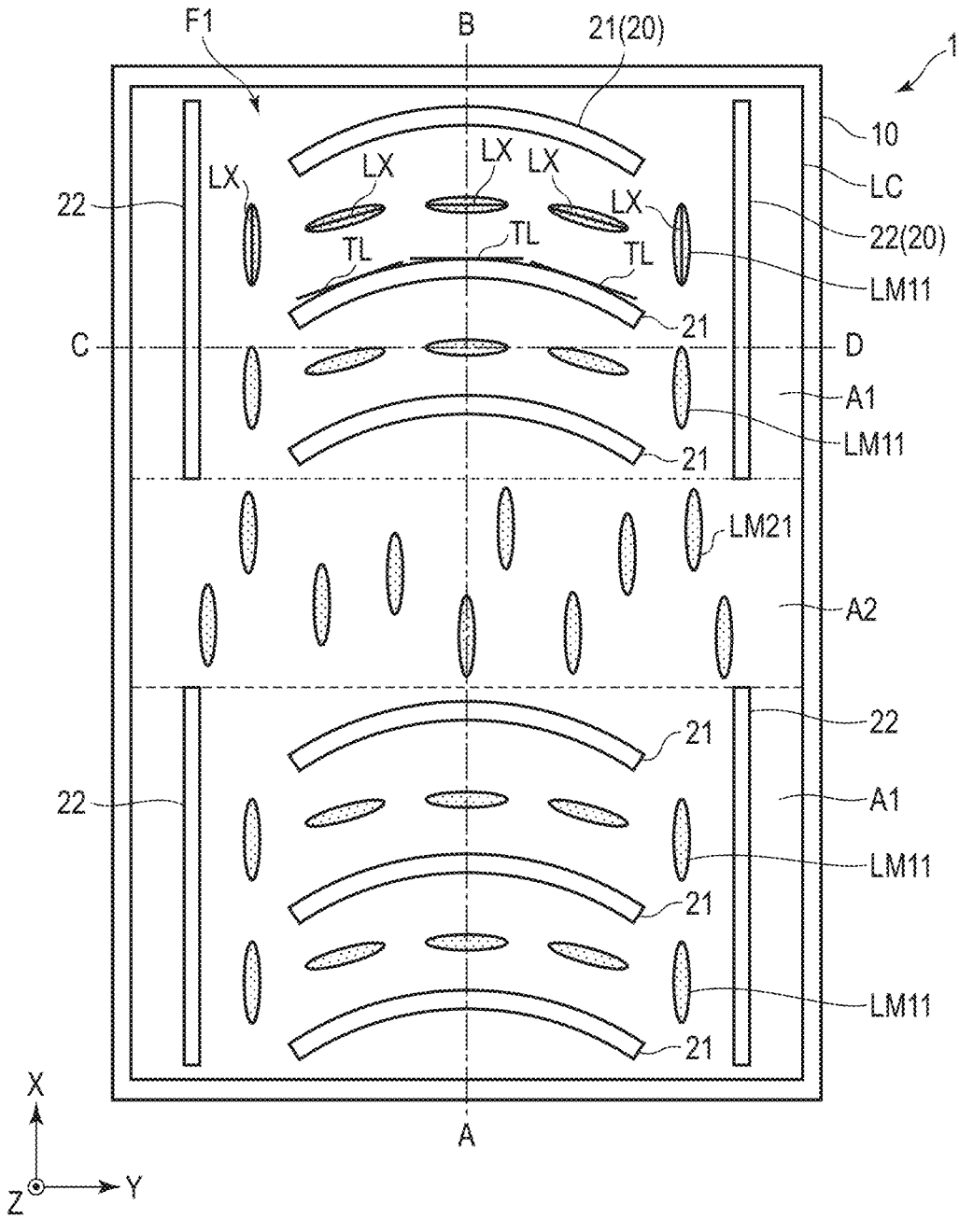
F I G. 11

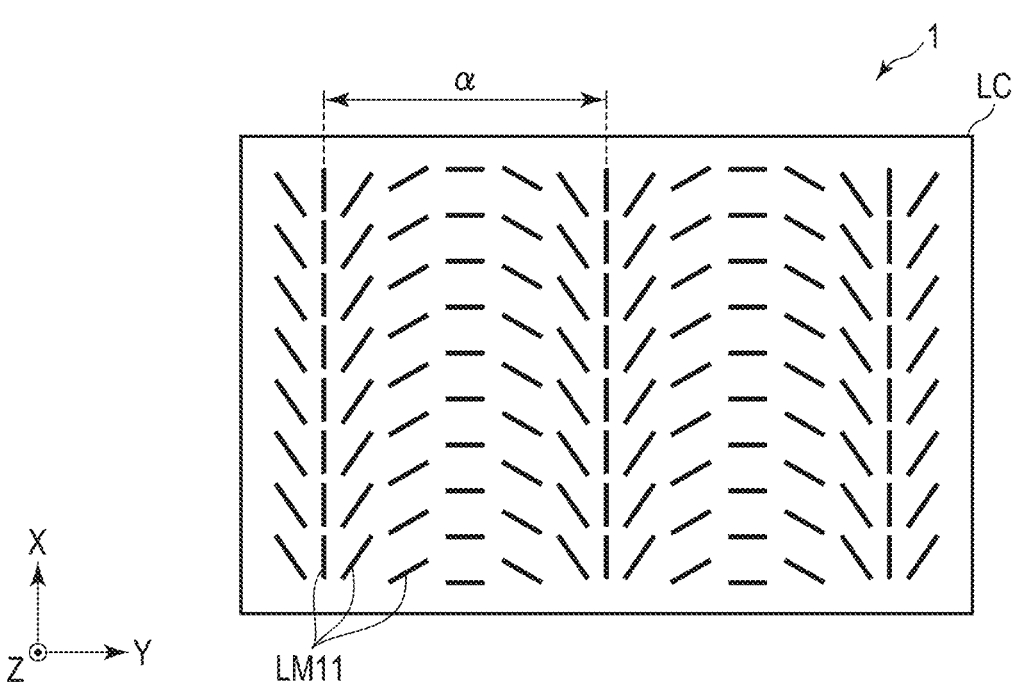
F I G. 12
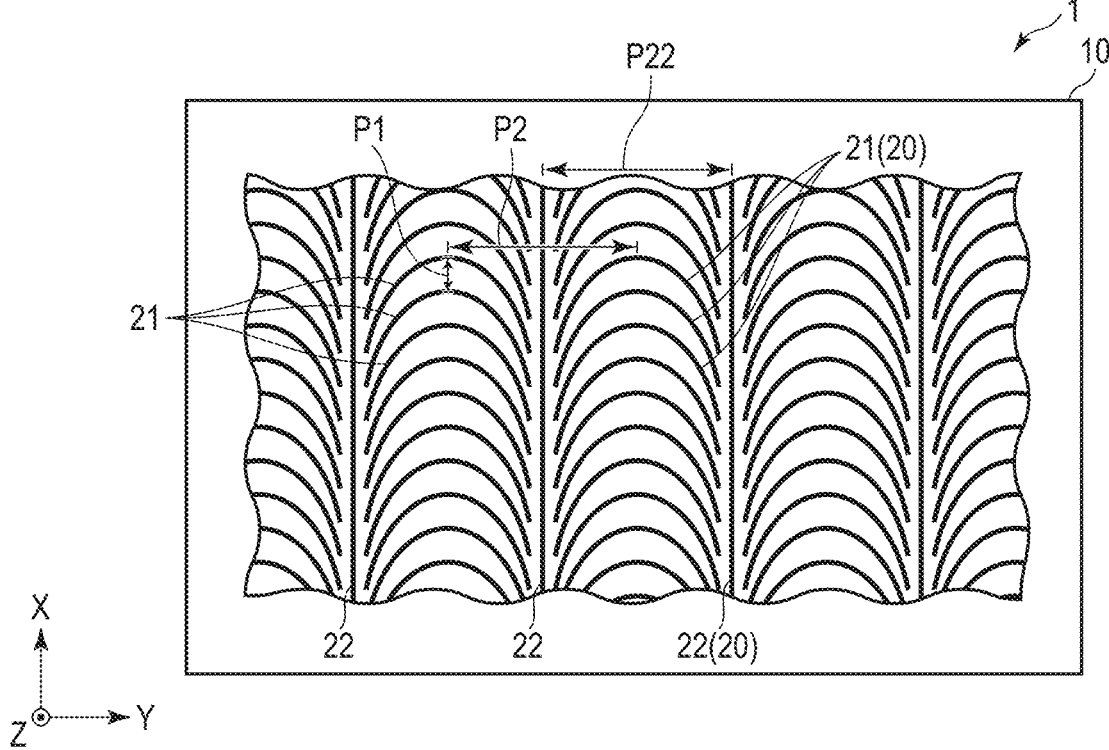
F I G. 13

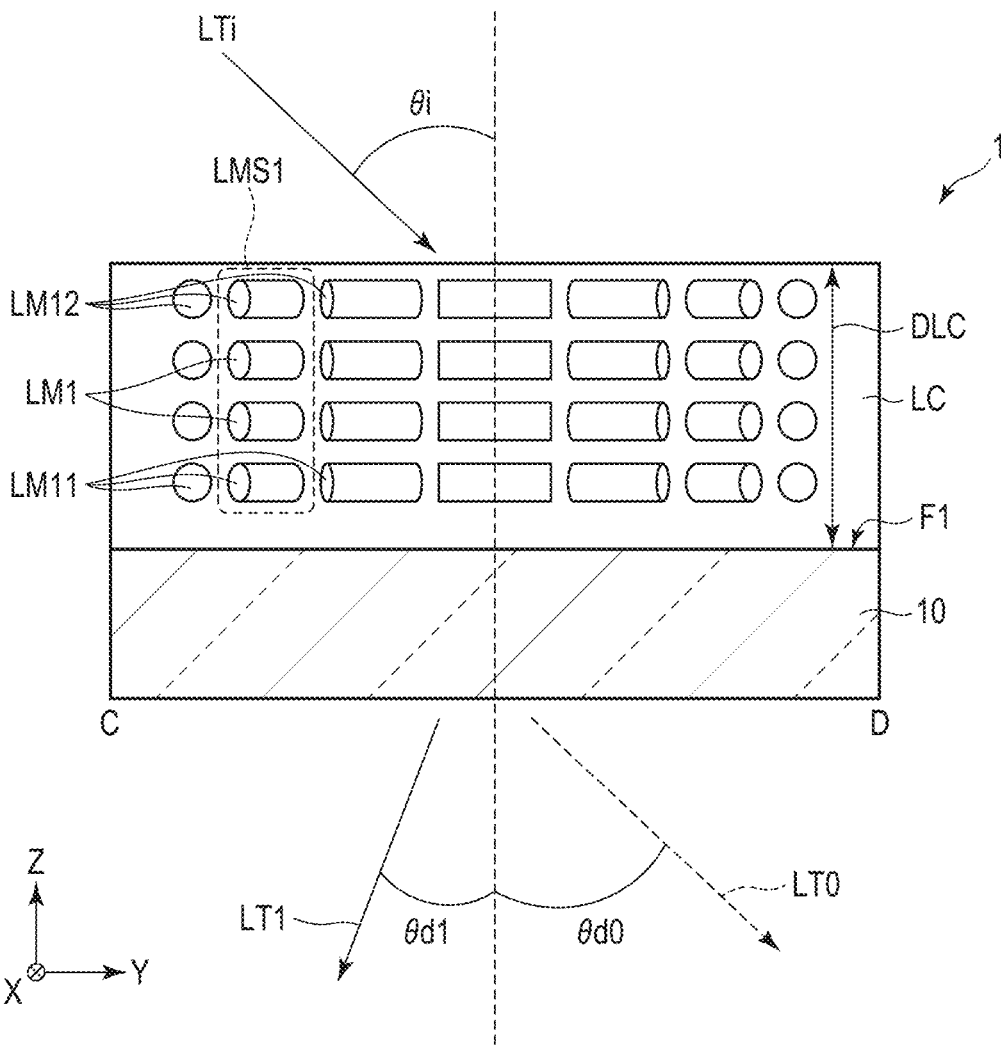
F I G. 14

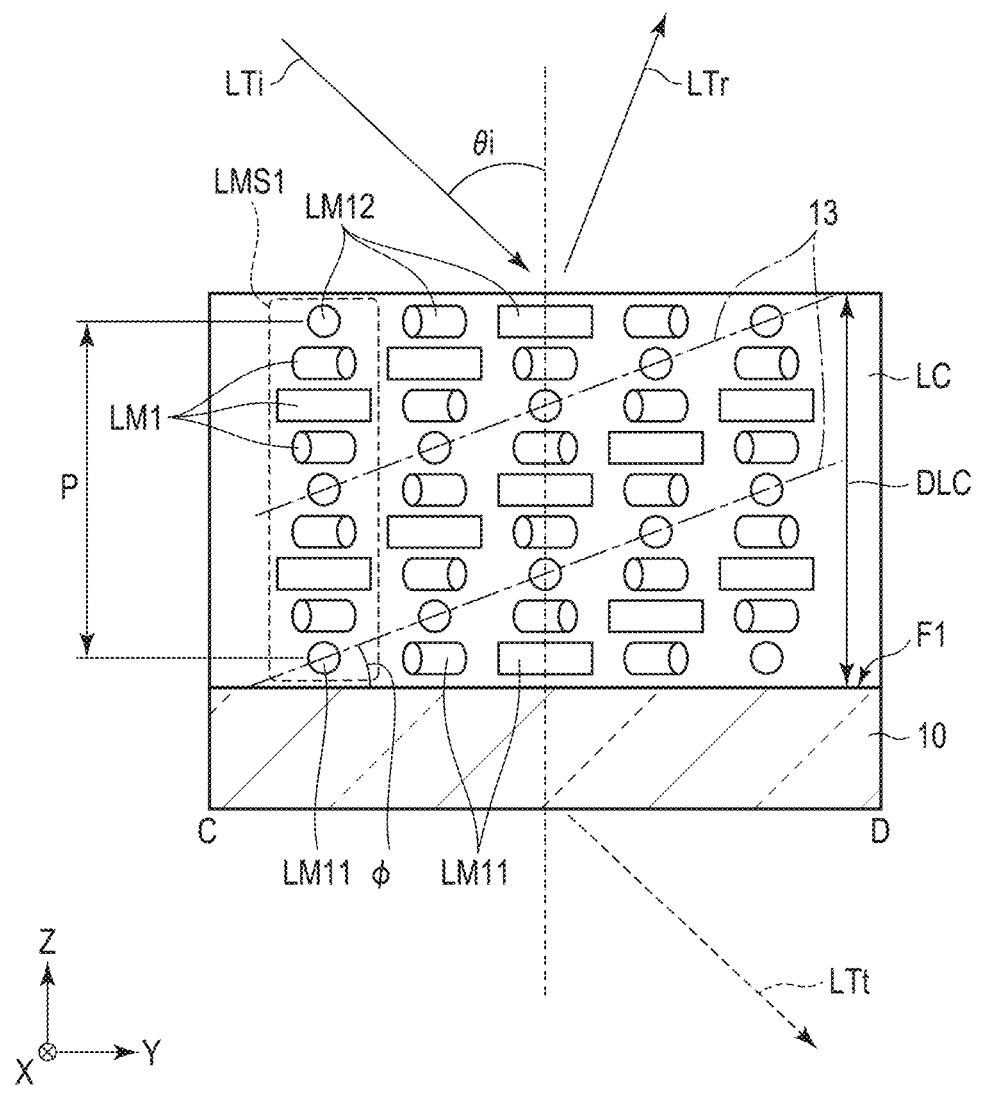
F I G. 15

LIQUID CRYSTAL OPTICAL ELEMENT

CROSS-REFERENCE TO RELATED APPLICATIONS

This application is a Continuation Application of PCT Application No. PCT/JP2022/046709, filed Dec. 19, 2022 and based upon and claiming the benefit of priority from Japanese Patent Application No. 2022-036132, filed Mar. 9, 2022, the entire contents of all of which are incorporated herein by reference.

FIELD

Embodiments described herein relate generally to a liquid crystal optical element.

BACKGROUND

For example, a liquid crystal polarization grating using a liquid crystal material is suggested. Such a liquid crystal polarization grating splits the incident light into 0-th-order diffracted light and first-order diffracted light when light with a wavelength $\lambda$ is made incident. When such a liquid crystal polarization grating is realized, increasing the productivity is required.

BRIEF DESCRIPTION OF THE DRAWINGS

FIG. 4 is a cross-sectional view schematically showing a liquid crystal optical element 1 of a second embodiment.

FIG. 5 is a cross-sectional view schematically showing a liquid crystal optical element 1 of a third embodiment.

FIG. 6 is a cross-sectional view schematically showing a liquid crystal optical element 1 of a fourth embodiment.

FIG. 7 is a cross-sectional view schematically showing a liquid crystal optical element 1 of a fifth embodiment.

FIG. 8 is a cross-sectional view schematically showing a liquid crystal optical element 1 of a sixth embodiment.

FIG. 9 is a cross-sectional view schematically showing a liquid crystal optical element 1 of a seventh embodiment.

FIG. 10 is a cross-sectional view schematically showing a liquid crystal optical element 1 of an eighth embodiment.

FIG. 11 is a plan view illustrating an alignment direction of liquid crystal molecules in the vicinity of a first main surface F1 of the liquid crystal optical element 1 of the embodiment.

FIG. 12 is a plan view schematically showing an example of an alignment pattern in a liquid crystal layer LC.

FIG. 13 is a plan view showing an example of a layout of the structures 20.

FIG. 14 is a cross-sectional view schematically showing a first configuration example of the liquid crystal optical element 1.

FIG. 15 is a cross-sectional view schematically showing a second configuration example of the liquid crystal optical element 1.

DETAILED DESCRIPTION

Figure 1:
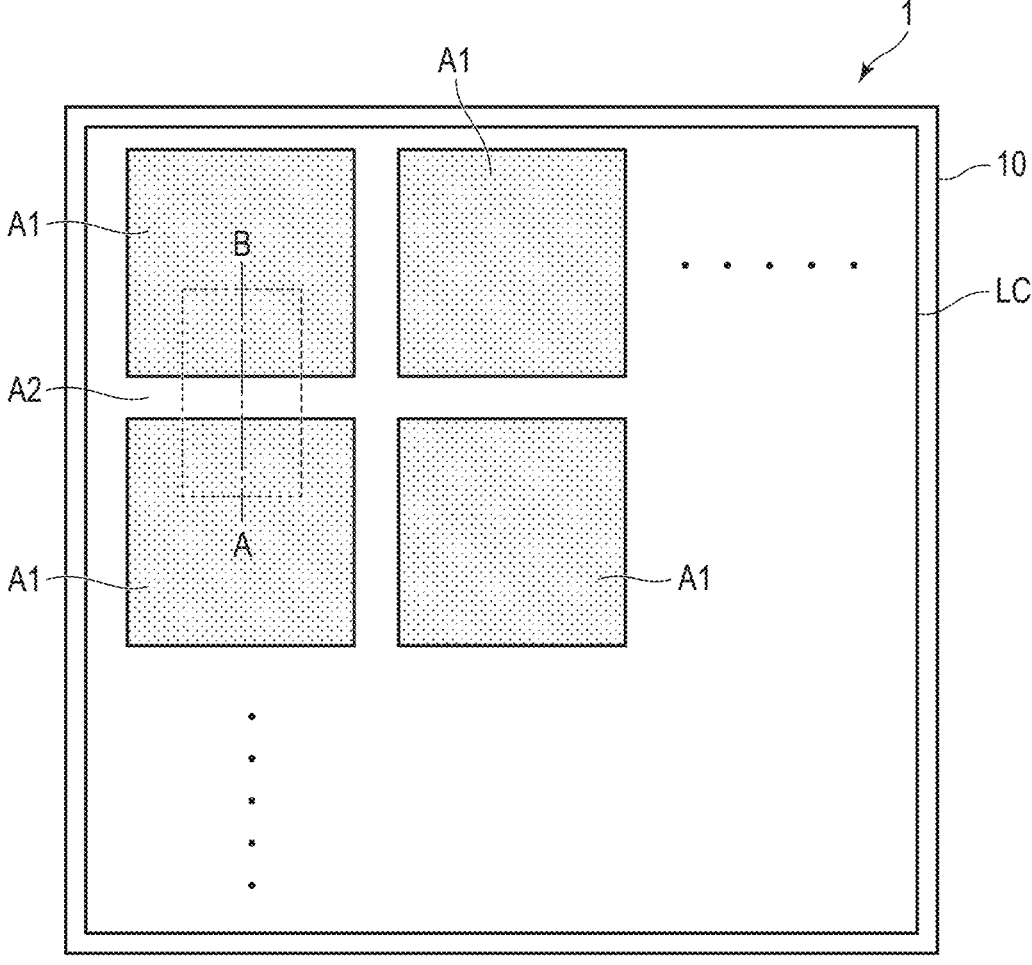
FIG. 1 is a plan view schematically showing a liquid crystal optical element 1 of an embodiment.
Figure 1:
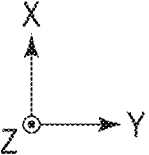

In general, according to one embodiment, a liquid crystal optical element comprises: a substrate having a first main surface; a plurality of structures arranged at a predetermined pitch in each of a plurality of first areas provided in a first direction and a second direction intersecting the first direction on the first main surface; and a liquid crystal layer provided over the plurality of first areas and a second area surrounding each of the plurality of first area. The liquid crystal layer contains first liquid crystal molecules provided between the adjacent structures and arranged along the structures, in the first areas, and second liquid crystal molecules with their long axes arranged in the same direction, in the second area, and is cured in a state in which alignment directions of the first liquid crystal molecules and the second liquid crystal molecules are fixed.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction along the X-axis is referred to as an X-direction or a first direction, a direction along the Y-axis is referred to as a Y-direction or a second direction, and a direction along the Z-axis is referred to as a Z-direction or a third direction. A plane defined by the X-axis and the Y-axis is referred to as an X-Y plane, and a plane defined by the X-axis and Z-axis is referred to as an X-Z plane. Viewing the X-Y plane is referred to as plan view.

First, a basic configuration of the liquid crystal optical element 1 will be described.

FIG. 1 is a plan view schematically showing the liquid crystal optical element 1. The liquid crystal optical element 1 comprises a substrate 10 and a liquid crystal layer LC provided on the substrate 10. The planar shape of the substrate 10 is a quadrangle in the illustrated example, but may be the other polygon, a circle or an ellipse.

The liquid crystal optical element 1 has a plurality of first areas A1 and a grating-shaped second area A2 surrounding these first areas A1. For example, the plurality of first areas A1 are formed in a matrix in the X-direction and the Y-direction. The first areas A1 are diffraction areas where incident light is diffracted. Such first areas (diffraction areas) A1 are formed by a plurality of structures provided at a predetermined pitch and liquid crystal molecules aligned in a predetermined direction by these structures. The structures will be described later. The liquid crystal layer LC is provided across the plurality of first areas A1 and the second area A2.

In recent years, demand for larger liquid crystal optical elements 1 has been increased. In a case of forming the structure of the first area A1 using the nanoimprint method, if the size of the mold to be used is increased as the size of the liquid crystal optical element 1 increases, the costs for manufacturing the mold may be increased and the weight of the mold may also be increased. Then, there is a method that prepares a mold smaller than the size of the substrate 10 and performs a step of pressing this mold against the resin layer while shifting the position of the mold. The structures of one first area A1 is formed by one stamping process of pressing the mold against the resin layer. At this time, it is desirable that the first area A1 formed in the first stamping process and the first area A1 formed in the second stamping process are close to each other, but a structure of a desired shape cannot be formed when the mold is pressed against the same portion a plurality of times. For this reason, a margin is generated between adjacent first areas A1. This margin corresponds to the second area A2. Thus, a large liquid crystal optical element 1 can be manufactured at low costs through a plurality of stamping processes using a mold smaller than the substrate size. In contrast, if the liquid crystal molecules located in the second area A2 are randomly aligned, the incident light may be scattered, and the liquid crystal optical element 1 may not be able to exhibit the required performance.

Several embodiments of the liquid crystal optical element 1 capable of suppressing undesired light scattering in the second area A2 will be described hereinafter with reference to the drawings.

First Embodiment

Figure 2:
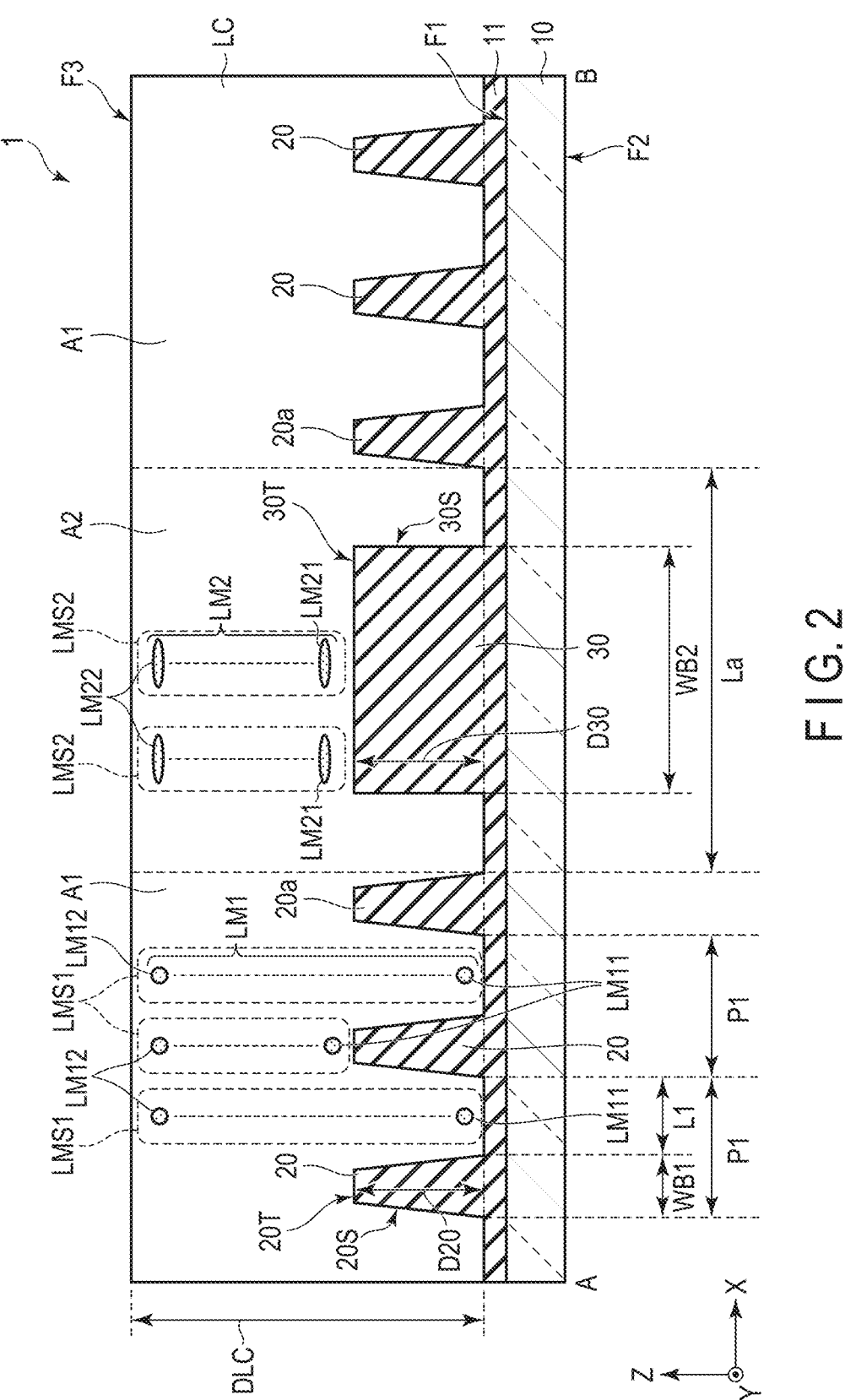
FIG. 2 is a cross-sectional view schematically showing the liquid crystal optical element 1 of the first embodiment.

FIG. 2 is a cross-sectional view schematically showing the liquid crystal optical element 1 of the first embodiment. FIG. 2 corresponds to a cross-sectional view of the liquid crystal optical element 1 along A-B line in an area surrounded by dotted line in FIG. 1.

The liquid crystal optical element 1 of the first embodiment comprises a substrate 10, a thin film 11, a plurality of structures 20, a partition 30, and a liquid crystal layer LC.

The substrate 10 is a transparent substrate that transmits light and is composed of, for example, a transparent glass plate or a transparent synthetic resin plate. The substrate 10 may be composed of, for example, a flexible transparent synthetic resin plate. The substrate 10 may have any shape. For example, the substrate 10 may be curved. The refractive index of the substrate 10 is, for example, larger than the refractive index of air.

In the present specification, "light" includes visible light and invisible light. For example, the wavelength of the lower limit of the visible light range is greater than or equal to 360 nm and less than or equal to 400 nm. The wavelength of the upper limit of the visible light range is greater than or equal to 760 nm and less than or equal to 830 nm. Visible light includes a first component (blue component) of a first wavelength band (for example, 400 nm to 500 nm), a second component (green component) of a second wavelength band (for example, 500 nm to 600 nm), and a third component (red component) of a third wavelength band (for example, 600 nm to 700 nm). Invisible light includes ultraviolet light in which the wavelength is shorter than the first wavelength band, and infrared light in which the wavelength is longer than the third wavelength band.

In the present specification, "transparent" desirably means colorless and transparent. However, "transparent" may mean semitransparent or colored and transparent.

The substrate 10 is shaped like a flat plate parallel to an X-Y plane and has a first main surface (inner surface) F1 and a second main surface (outer surface) F2. The first main surface F1 and the second main surface F2 are surfaces substantially parallel to the X-Y plane and face each other in the Z-direction. The second main surface F2 is in contact with, for example, air, but may be covered with the other thin film.

The thin film 11 is provided on the first main surface F1 of the substrate 10. For example, the thin film 11 may be formed of an organic material or formed of an inorganic material.

The plurality of structures 20 are provided on the first main surface F1 in each of the first areas A1. In this case, the structure 20 is a convex body extending from the thin film 11 in the Z-direction. The plurality of structures 20 have a function of defining the alignment direction of the liquid crystal molecules contained in the liquid crystal layer LC, which will be described later. The structure 20 is formed of the same organic material as the thin film 11 and is integrated with the thin film 11. The thin film 11 is provided between the adjacent structures 20 in the first area A1, and covers the first main surface F1. The plurality of structures 20 are arranged along the X-direction at a predetermined first pitch P1. Although not shown in FIG. 2, the plurality of structures 20 are arranged along the Y-direction at a second pitch P2 that is different from the first pitch P1.

In addition, the structures 20 adjacent along the X-direction are provided to be separated in a distance L1. In one example, the distance L1 is between 50 nm and 1,500 nm, preferably between 100 nm and 1,000 nm.

A structure 20a located at the outermost periphery of the first area A1 and a structure 20a located at the outermost periphery of another adjacent first area A1 are provided to be separated from each other in a predetermined distance La in the X-direction. Similarly, although not shown in FIG. 2, the structures 20a are also provided to be separated in a predetermined distance in the Y-direction. The second area A2 corresponds to an area between two adjacent structures 20a. In other words, the distance La corresponds to the width of the second area A2.

In one example, the distance La is between 100 μm and 5 mm, preferably 1 mm or less. The distance La is larger than the predetermined first pitch P1 of the structures 20.

The structure 20 has a cross-sectional shape tapered along the Z-direction, for example, in the X-Z plane. In addition, the structure 20 has a top portion 20T and side surfaces 20S. The side surfaces 20S face each other in the X-direction. Each of the side surfaces 20S is an inclined surface that is inclined with respect to the Z-direction.

Each of the structures 20 has a substantially constant thickness D20 from the thin film 11 along the Z-direction. In one example, the thickness D20 is between 100 nm and 2,000 nm, preferably between 300 nm and 1,000 nm. The width WB1 is, for example, between 50 nm and 1,500 nm, preferably between 100 nm and 1,000 nm.

In addition, the thickness D20 is equal to or larger than the distance L1 between the structures 20 adjacent along the X-direction. Incidentally, from the viewpoint of defining the alignment direction of the liquid crystal molecules, the distance L1 is desirably small, and the thickness D20 is desirably large. However, in consideration of the productivity in a case of forming the structure 20 in a manufacturing method using a mold, which will be described later, the distance L1 is desirably large, and the thickness D20 is desirably small.

The partition 30 is provided on the first main surface F1 in the second area A2. In this case, the partition 30 is a convex body extending from the thin film 11 in the Z-direction. Such a partition 30 is subjected to the alignment treatment so as to define the alignment direction of the liquid crystal molecules overlapping with the partition 30 of the liquid crystal layer LC, which will be described in detail later. The partition 30 is formed of the same material as the thin film 11 and the structures 20 and is integrated with the thin film 11.

The partition 30 is separated from the structures 20a in the example shown in FIG. 2, but may be integrated with the structures 20a. The thin film 11 is provided between the structure 20a and the partition 30, and covers the first main surface F1.

The partition 30 has a top portion 30T and side surfaces 30S. The side surfaces 30S face each other.

The width WB2 of the partition 30 is the same as or smaller than the distance La, and larger than the width WB1 of the structure 20. In one example, the width WB2 is between 100 μm and 5 mm.

The partition 30 has a substantially constant thickness D30 along the Z-direction from the thin film 11. The thickness D30 of the partition 30 is substantially the same as the thickness D20 of the structure 20, but may be larger than the thickness D20.

The refractive index of the thin film 11, the structures 20, and the partition 30 is equivalent to the refractive index of the substrate 10. For this reason, the light that reaches the interface between the substrate 10 and the thin film 11 is hardly refracted.

The liquid crystal layer LC surrounds each of the plurality of structures 20 and the partition 30. The liquid crystal layer LC is in contact with the top portion 20T and the side surfaces 20S of the structure 20, and the top portion 30T and the side surfaces 30S of the partition 30. In addition, the liquid crystal layer LC is in contact with the thin film 11 between the adjacent structures 20 in the first area A1. Furthermore, the liquid crystal layer LC is in contact with the thin film 11 between the structure 20a and the partition 30 in the second area A2.

The liquid crystal layer LC has a thickness DLC from the thin film 11 along the Z-direction. The thickness DLC of the liquid crystal layer LC is larger than the thickness D20 of the structure 20. In one example, the thickness DLC is between 1,000 nm and 14,000 nm, preferably between 5,000 nm and 12,000 nm.

In addition, the thickness DLC of the liquid crystal layer LC is larger than the thickness D30 of the partition 30.

The thickness DLC of the liquid crystal layer LC is larger than the distance L1 between the adjacent structures 20.

The thickness DLC of the liquid crystal layer LC described here corresponds to the thickness in a case where the liquid crystal layer LC is a single-layer. Incidentally, the liquid crystal layer LC may be a multilayer body in which a plurality of layers are stacked.

In the example shown in FIG. 2, no other thin film or substrate overlaps on the liquid crystal layer LC in the Z-direction. In other words, the liquid crystal layer LC has a main surface F3 that is in contact with air. Incidentally, the main surface F3 may be covered with the other thin film such as a protective film.

The liquid crystal layer LC includes a plurality of first liquid crystal structures LMS1 located in the first area A1 and a plurality of second liquid crystal structures LMS2 located in the second area A2.

The first liquid crystal structure LMS1 contains a plurality of first liquid crystal molecules LM1. In this example, the first liquid crystal molecules LM1 located on the first main surface F1 side are referred to as liquid crystal molecules LM11, and the first liquid crystal molecules LM1 located on the main surface F3 side are referred to as liquid crystal molecules LM12.

The second liquid crystal structure LMS2 contains a plurality of second liquid crystal molecules LM2. In this example, the second liquid crystal molecules LM2 located on the first main surface F1 side are referred to as liquid crystal molecules LM21, and the second liquid crystal molecules LM2 located on the main surface F3 side are referred to as liquid crystal molecules LM22.

When the first liquid crystal structure LMS1 is focused, the liquid crystal molecules LM11 are located between the adjacent structures 20 and are close to the thin film 11. Liquid crystal molecules LM12 are located above the structures 20 along the Z-direction and are close to a main surface F3. In addition, the first liquid crystal structure LMS1 is also located above the structure 20.

The alignment direction of the liquid crystal molecules LM11 is defined by the adjacent structures 20. The relationship between the alignment direction and the structures 20 will be described later. The first liquid crystal structure LMS1 can be regarded as a continuum in which a plurality of first liquid crystal molecules LM1 including the liquid crystal molecules LM11 and LM12 are arranged in the Z-direction. For this reason, since the alignment direction of the liquid crystal molecules LM11 is defined by the structures 20, the alignment direction of the plurality of first liquid crystal molecules LM1 arranged in the Z-direction is defined according to the alignment direction of the liquid crystal molecules LM11. As a result, the plurality of first liquid crystal molecules LM1 in the first liquid crystal structure LMS1 are horizontally aligned in a predetermined direction in the X-Y plane. In this case, the horizontal alignment means to have the long axis of the molecule in a direction horizontal to the first main surface F1.

When the second liquid crystal structure LMS2 is focused, the liquid crystal molecules LM21 are located above the partition 30 and are close to the top portion 30T. Liquid crystal molecules LM22 are located above along the Z-direction and are close to a main surface F3.

The alignment direction of the liquid crystal molecules LM21 is defined by the alignment restriction force of the partition 30 subjected to the alignment treatment. The second liquid crystal structure LMS2 can be regarded as a continuum in which a plurality of second liquid crystal molecules LM2 including the liquid crystal molecules LM21 and LM22 are arranged in the Z-direction. For this reason, since the alignment direction of the liquid crystal molecules LM21 is defined, the alignment direction of the plurality of second liquid crystal molecules LM2 arranged in the Z-direction is defined according to the alignment direction of the liquid crystal molecules LM21. As a result, the plurality of second liquid crystal molecules LM2 in the second liquid crystal structures LMS2 are uniformly horizontally aligned in the same direction in the X-Y plane. The alignment direction of the second liquid crystal molecules LM2 is not particularly limited as long as the alignment direction is uniform in the same direction in the X-Y plane. In the example shown in FIG. 2, the second liquid crystal molecules LM2 are uniformly aligned in the X-direction.

The liquid crystal layer LC is cured in a state in which the alignment directions of the liquid crystal molecules containing the first liquid crystal molecules LM1 and the second liquid crystal molecules LM2 are fixed. In other words, the alignment directions of the liquid crystal molecules are not controlled depending on the electric field. For this reason, the liquid crystal optical element 1 does not comprise an electrode for alignment control. Such a liquid crystal layer LC is formed by, for example, applying energy such as light to monomers and polymerizing the monomers.

Figure 3:
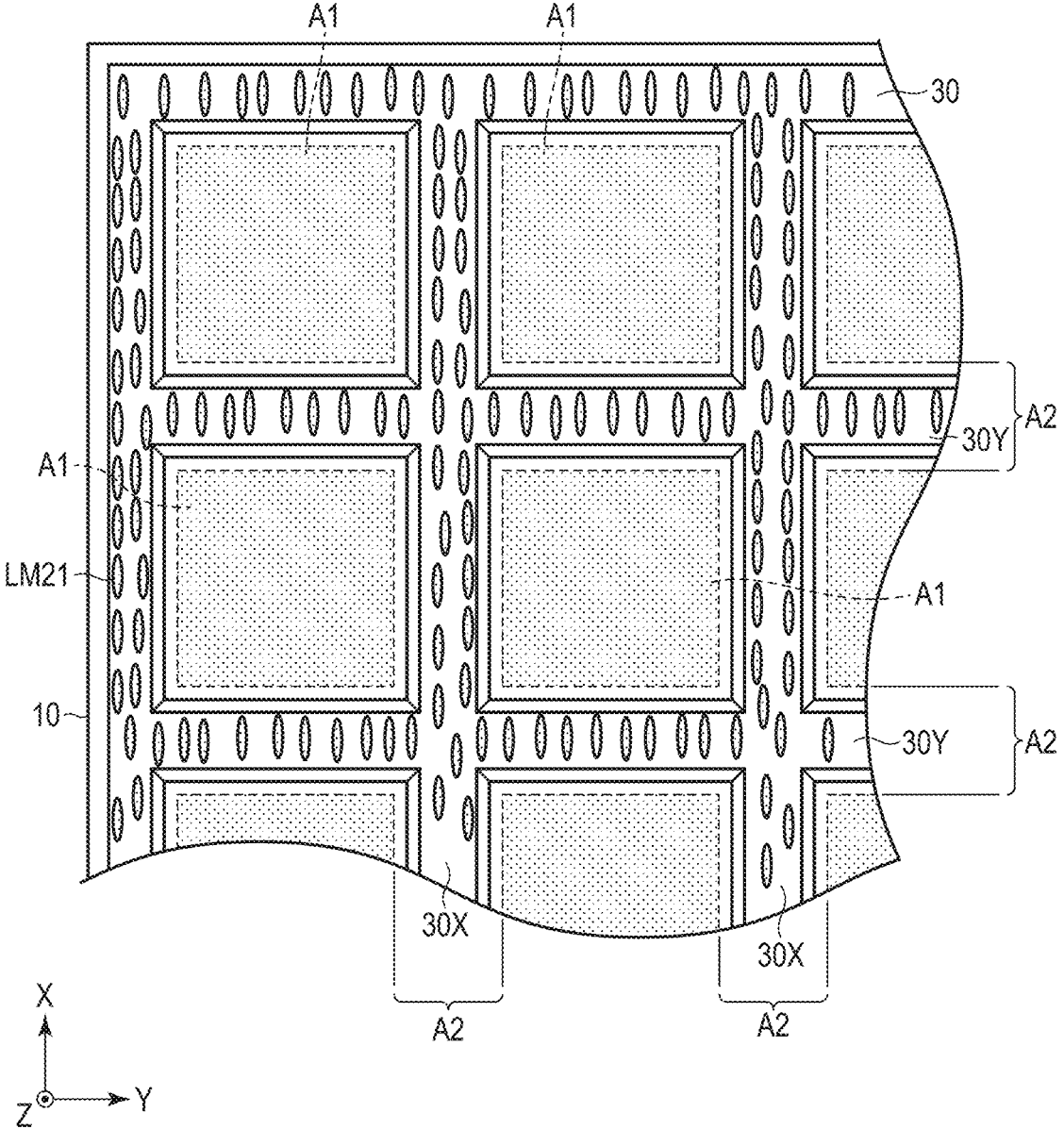
FIG. 3 is a plan view schematically showing a partition 30 of the liquid crystal optical element 1 of an embodiment.

FIG. 3 is a plan view showing the partition 30 shown in FIG. 2. Incidentally, in FIG. 3, illustration of the structures 20 is omitted, and liquid crystal molecules LM21 of the liquid crystal layer LC are illustrated. The partition 30 is formed in a grating shape including extending portions 30X extending in the X-direction and extending portions 30Y extending in the Y-direction, and surrounds each of a plurality of first areas A1 arranged along the X-direction and the Y-direction. The liquid crystal molecules LM21 overlap with the extending portions 30X and 30Y, and are aligned such that their long axes are substantially parallel to the X-direction.

Second Embodiment

FIG. 4 is a cross-sectional view schematically showing a liquid crystal optical element 1 of a second embodiment. FIG. 4 corresponds to a cross-sectional view of the liquid crystal optical element 1 along A-B line shown in FIG. 1.

Description of the same configuration as the above-described first embodiment will be omitted with reference to the above description. In particular, a configuration of a first area A1 is the same as that in the first embodiment, and its description will be omitted.

The liquid crystal optical element 1 of the second embodiment comprises a substrate 10, a thin film 11, a plurality of structures 20, and a liquid crystal layer LC. The liquid crystal optical element 1 of the second embodiment is different from the liquid crystal optical element 1 of the first embodiment in that the partition 30 is not provided.

In a second area A2, the thin film 11 covers a first main surface F1. A thickness D11 of the thin film 11 is substantially constant between adjacent structures 20a.

The liquid crystal layer LC surrounds each of the plurality of structures 20 in the first area A1, and is in contact with the thin film 11 between the adjacent structures 20. In addition, the liquid crystal layer LC is in contact with the thin film 11 in the second area A2.

In the second area A2, liquid crystal molecules LM21 of second liquid crystal structures LMS2 are close to the thin film 11. Liquid crystal molecules LM22 are located above along the Z-direction and are close to a main surface F3.

The alignment direction of the liquid crystal molecules LM21 is defined by the alignment restriction force of the thin film 11 subjected to the alignment treatment. For this reason, since the alignment direction of the liquid crystal molecules LM21 is defined, the alignment direction of the plurality of second liquid crystal molecules LM2 arranged in the Z-direction is defined according to the alignment direction of the liquid crystal molecules LM21. As a result, the plurality of second liquid crystal molecules LM2 in the second liquid crystal structures LMS2 are uniformly horizontally aligned in the same direction in the X-Y plane.

Third Embodiment

FIG. 5 is a cross-sectional view schematically showing a liquid crystal optical element 1 of a third embodiment. FIG. 5 corresponds to a cross-sectional view of the liquid crystal optical element 1 along A-B line shown in FIG. 1.

Description of the same configuration as the above-described first embodiment will be omitted with reference to the above description.

The liquid crystal optical element 1 of the third embodiment comprises a substrate 10, a plurality of structures 20, a partition 30, and a liquid crystal layer LC. The liquid crystal optical element 1 of the third embodiment is different from the liquid crystal optical element 1 of the first embodiment in that the thin film 11 is not provided.

Each of the plurality of structures 20 is provided in a first area A1 and is in contact with a first main surface F1. In this case, the structure 20 is a convex body extending from the first main surface F1 in the Z-direction.

The partition 30 is provided in a second area A2 and is in contact with the first main surface F1. In this case, the partition 30 is a convex body extending from the first main surface F1 in the Z-direction. The partition 30 is formed of the same material as the structure 20.

The first main surface F1 is exposed between adjacent structures 20. In addition, the first main surface F1 is also exposed between structures 20a and the partition 30.

The liquid crystal layer LC surrounds each of the plurality of structures 20 in the first area A1, and also surrounds the partition 30 in the second area A2. In addition, the liquid crystal layer LC is in contact with the first main surface F1 between the adjacent structures 20, and is in contact with the first main surface F1 between the structures 20a and the partition 30.

Liquid crystal molecules LM11 of first liquid crystal structures LMS1 are located between the adjacent structures 20 and are close to the first main surface F1. Liquid crystal molecules LM12 are located above the structures 20 along the Z-direction and are close to a main surface F3. In addition, first liquid crystal molecules LM1 are horizontally aligned along the structures 20.

Liquid crystal molecules LM21 of second liquid crystal structures LMS2 are close to the partition 30. The liquid crystal molecules 22 are located above along the Z-direction and are close to the main surface F3. In addition, the second liquid crystal molecules LM2 are uniformly horizontally aligned in the same direction.

Although not shown, the liquid crystal optical element 1 of the third embodiment may not comprise the partition 30, similarly to the second embodiment shown in FIG. 4. At this time, the first main surface F1 is exposed in the second area A2.

The liquid crystal layer LC is in contact with the first main surface F1 in the second area A2.

The liquid crystal molecules LM21 of the second liquid crystal structures LMS2 are located in the second area A2 and are close to the first main surface F1. The liquid crystal molecules 22 are located above along the Z-direction and are close to the main surface F3. In addition, the second liquid crystal molecules LM2 are uniformly horizontally aligned in the same direction.

Fourth Embodiment

FIG. 6 is a cross-sectional view schematically showing a liquid crystal optical element 1 of a fourth embodiment. FIG. 6 corresponds to a cross-sectional view of the liquid crystal optical element 1 along A-B line shown in FIG. 1.

Description of the same configuration as the above-described first embodiment will be omitted with reference to the above description.

The liquid crystal optical element 1 of the fourth embodiment comprises a substrate 10, a thin film 11, a plurality of structures 20, a partition 30, and a liquid crystal layer LC. The liquid crystal optical element 1 of the fourth embodiment is different from the liquid crystal optical element 1 of the first embodiment in that second liquid crystal molecules LM2 are uniformly vertically aligned. Although not shown, the liquid crystal optical element 1 may not comprise at least one of the thin film 11 and the partition 30.

In this case, the vertical alignment means to have the long axis direction of the molecule in a direction vertical to the first main surface F1 (i.e. Z-direction). Liquid crystal molecules LM21 of second liquid crystal structures LMS2 are close to a part above the partition 30. Liquid crystal molecules LM22 are located above along the Z-direction and are close to a main surface F3.

The alignment direction of the liquid crystal molecules LM21 is defined by the alignment restriction force of the partition 30 subjected to the alignment treatment. Since the alignment direction of the liquid crystal molecules LM21 is defined, the alignment direction of the plurality of second liquid crystal molecules LM2 arranged in the Z-direction is defined according to the alignment direction of the liquid crystal molecules LM21. Accordingly, the plurality of second liquid crystal molecules LM2 in the second liquid crystal structures LMS2 are uniformly aligned in the Z-direction.

The feature that the liquid crystal molecules LM2 are vertically aligned can also be applied to the second embodiment shown in FIG. 4 and the third embodiment shown in FIG. 5.

The liquid crystal optical element 1 may further comprise an alignment film 12 that is provided between the first main surface F1 and the liquid crystal layer LC and that is in contact with the liquid crystal layer LC.

Liquid crystal optical elements 1 of several embodiments, which comprise alignment films 12, will be described below. Description of the same configuration as the above-described first embodiment, second embodiment, third embodiment, and fourth embodiment will be omitted with reference to the above description.

Fifth Embodiment

FIG. 7 is a cross-sectional view schematically showing a liquid crystal optical element 1 of a fifth embodiment. FIG. 7 corresponds to a cross-sectional view of the liquid crystal optical element 1 along A-B line shown in FIG. 1.

The liquid crystal optical element 1 of the fifth embodiment comprises a substrate 10, a thin film 11, a plurality of structures 20, a partition 30, an alignment film 12, and a liquid crystal layer LC.

The alignment film 12 has an alignment restriction force to align liquid crystal molecules in a desired direction. A vertical alignment film or a horizontal alignment film can be applied as the alignment film 12.

In each of embodiments described below, a case in which a horizontal alignment film is applied as the alignment film 12 will be described. The horizontal alignment film has an alignment restriction force in a predetermined direction in the X-Y plane. The alignment restriction force is generated by executing the alignment treatment. Rubbing treatment, photo-alignment treatment, or the like can be applied as the alignment treatment.

Incidentally, when a vertical alignment film is used as the alignment film 12, the process load can be reduced since the alignment treatment is unnecessary. At this time, it is desirable to reduce the polar angle anchoring energy at the interface between the alignment film 12 and the liquid crystal layer LC.

The alignment film 12 covers each of the plurality of structures 20 and is in contact with a top portion 20T and side surfaces 20S of the structure 20. In addition, the alignment film 12 covers the partition 30 and is in contact with a top portion 30T and side surfaces 30S of the partition 30. In addition, the alignment film 12 is in contact with the thin film 11 between adjacent structures 20. In addition, the alignment film 12 is in contact with the thin film 11 between the structure 20a and the partition 30. In the example shown in FIG. 7, the alignment film 12 is not in contact with a first main surface F1 of the substrate 10.

The liquid crystal layer LC is in contact with the alignment film 12 in the first area A1 and the second area A2. As described above, the first liquid crystal molecules LM1 of the first liquid crystal structure LM1 are aligned in a predetermined direction by the structures 20. For this reason, the process of aligning the alignment film 12 in the first area A1 may be omitted or the alignment film 12 in the first area may be omitted.

In contrast, the second liquid crystal molecules LM2 of the second liquid crystal structure LM2 are aligned in a predetermined direction by the alignment restriction force of the alignment film 12.

Although not shown, the liquid crystal optical element 1 of the fifth embodiment may not comprise the thin film 11, similar to the third embodiment shown in FIG. 5. In this case, the plurality of structures 20 and the partition 30 are in contact with the first main surface F1. The alignment film 12 covers each of the structures 20 and the partition 30, is in contact with the first main surface F1 between the adjacent structures 20, and is in contact with the first main surface F1 between the structure 20a and the partition 30.

Sixth Embodiment

FIG. 8 is a cross-sectional view schematically showing a liquid crystal optical element 1 of a sixth embodiment. FIG. 8 corresponds to a cross-sectional view of the liquid crystal optical element 1 along A-B line shown in FIG. 1.

Description of the same configuration as the above-described fifth embodiment will be omitted with reference to the above description.

The liquid crystal optical element 1 of the sixth embodiment comprises a substrate 10, a thin film 11, a plurality of structures 20, an alignment film 12, and a liquid crystal layer LC. The liquid crystal optical element 1 of the sixth embodiment is different from the liquid crystal optical element 1 of the fifth embodiment in that the partition 30 is not provided.

The thin film 11 covers a first main surface F1 of a second area A2. The alignment film 12 is in contact with the thin film 11 in the second area A2. The alignment film 12 is not in contact with the first main surface F1.

Although not shown, the liquid crystal optical element 1 of the sixth embodiment may not comprise the thin film 11, similarly to the third embodiment shown in FIG. 5. In this case, the plurality of structures 20 are in contact with the first main surface F1. The alignment film 12 covers the structures 20, is in contact with the first surface F1 between the adjacent structures 20, and is in contact with the first main surface F1 in the second area A2 (between adjacent structures 20a).

Seventh Embodiment

FIG. 9 is a cross-sectional view schematically showing a liquid crystal optical element 1 of a seventh embodiment.

FIG. 9 corresponds to a cross-sectional view of the liquid crystal optical element 1 along A-B line shown in FIG. 1.

Description of the same configuration as the above-described fifth embodiment will be omitted with reference to the above description.

The liquid crystal optical element 1 of the seventh embodiment comprises a substrate 10, a thin film 11, a plurality of structures 20, a partition 30, an alignment film 12, and a liquid crystal layer LC. The liquid crystal optical element 1 of the seventh embodiment is different from the liquid crystal optical element 1 of the fifth embodiment in that the alignment film 12 is provided only in a second area A2.

The alignment film 12 is provided only on a top portion 30T of the partition 30. Incidentally, the alignment film 12 may cover side surfaces 30S of the partition 30. The alignment film 12 is not provided in the first area A1, exposes the structures 20 and the thin film 11, and is not in contact with a first main surface F1.

The liquid crystal layer LC surrounds each of the structures 20 in the first area A1 and is in contact with a top portion 20T and side surfaces 20S of the structure 20. In addition, the liquid crystal layer LC surrounds the partition 30 and is in contact with the side surfaces 30S of the partition 30. The liquid crystal layer LC is not in contact with the top portion 30T of the partition 30, but is in contact with the alignment film 12 provided on the top portion 30T of the partition 30. In addition, the liquid crystal layer LC is in contact with the thin film 11 between adjacent structures 20 and is in contact with the thin film 11 between structures 20a and the partitions 30.

Although not shown, the liquid crystal optical element 1 of the seventh embodiment may not comprise the thin film 11, similarly to the third embodiment shown in FIG. 5.

Eighth Embodiment

FIG. 10 is a cross-sectional view schematically showing a liquid crystal optical element 1 of an eighth embodiment. FIG. 10 corresponds to a cross-sectional view of the liquid crystal optical element 1 along A-B line shown in FIG. 1.

Description of the same configuration as the above-described sixth embodiment will be omitted with reference to the above description.

The liquid crystal optical element 1 of the eighth embodiment comprises a substrate 10, a thin film 11, a plurality of structures 20, an alignment film 12, and a liquid crystal layer LC. The liquid crystal optical element 1 of the eighth embodiment is different from the liquid crystal optical element 1 of the sixth embodiment in that the alignment film 12 is provided only in a second area A2.

The alignment film 12 is provided only on the thin film 11 in the second area A2. The alignment film 12 is not provided in a first area A1, exposes the structures 20, and is not in contact with a first main surface F1 of the substrate 10.

The liquid crystal layer LC surrounds each of the plurality of structures 20 and is in contact with a top portion 20T and side surfaces 20S of the structure 20. In addition, the liquid crystal layer LC is in contact with the thin film 11 between adjacent structures 20, and is in contact with the alignment film 12 in the second area A2 (between adjacent structures 20a).

Although not shown, the liquid crystal optical element 1 of the eighth embodiment may not comprise the thin film 11, similarly to the third embodiment shown in FIG. 5. In this case, the plurality of structures 20 are in contact with the first main surface F1. The alignment film 12 is provided only on the first main surface F1 of the second area A2 (between adjacent structures 20a) and is in contact with the first main surface F1.

FIG. 11 is a plan view illustrating the alignment directions of the liquid crystal molecules LM11 and LM21 in the vicinity of the first main surface F1 of the liquid crystal optical element 1 shown in FIG. 1. FIG. 11 corresponds to a plan view of the liquid crystal optical element 1 in which the area surrounded by the dotted line in FIG. 1 is enlarged.

The plurality of structures 20 include a plurality of first structures 21 and a plurality of second structures 22 in the first area A1.

Incidentally, the structures 20 are not provided in the second area A2.

The plurality of first structures 21 are arranged at intervals along the X-direction. In addition, the plurality of first structures 21 are formed to have substantially the same shape in plan view, and are formed in, for example, an arch shape protruding in the X-direction.

The plurality of second structures 22 are arranged at intervals along the Y-direction. In addition, the plurality of second structures 22 are formed to have substantially the same shape in plan view and, for example, extend linearly along the X-direction.

The liquid crystal molecules LM11 provided between the first structures 21 are cured with their long axes LX aligned along tangents TL of the first structures 21. In addition, the liquid crystal molecules LM11 provided between the first structures 21 and the second structures 22 are cured with their long axes LX aligned along extension directions of the second structures 22.

Thus, the alignment directions of the liquid crystal molecules LM11 are defined by the structures 20 provided in the first area A1. In addition, the alignment directions of the plurality of first liquid crystal molecules LM1 arranged in the Z-direction including the liquid crystal molecules LM12 are defined according to the alignment directions of the liquid crystal molecules LM11. Therefore, the plurality of first liquid crystal molecules LM1 including the liquid crystal molecules LM11 and the liquid crystal molecules LM12 are each aligned in a predetermined direction in the X-Y plane.

The liquid crystal molecules LM21 provided in the second area A2 are uniformly aligned in the same direction. The alignment directions of the liquid crystal molecules 21 are defined by an alignment restriction force applied to the surface of the second area A2 that is in contact with the liquid crystal layer LC. The alignment restriction force in the second area A2 is applied to, for example, the partition 30. The alignment restriction force in the second area A2 is applied to the thin film 11 if the partition 30 is omitted. In addition, the alignment restriction force in the second area A2 is applied to the first main surface F1 if the partition 30 and the thin film 11 are omitted. The alignment restriction force can be applied by an alignment treatment which will be described in detail later.

The alignment directions of the plurality of second liquid crystal molecules LM2 arranged in the Z-direction including the liquid crystal molecules LM22 are defined according to the alignment directions of the liquid crystal molecules LM21. As a result, the plurality of second liquid crystal molecules LM2 including the liquid crystal molecules LM21 and the liquid crystal molecules LM22 are each uniformly aligned in a predetermined direction in the X-Y plane.

Incidentally, the second liquid crystal molecules LM2 provided in the vicinity of the first area A1 may not be aligned in the same direction as the other second liquid crystal molecules LM2 due to the influence of the structures 20, which is not a problem in the liquid crystal optical element 1 of each of the embodiments.

(Example of Alignment Pattern of First Liquid Crystal Molecules LM1)

FIG. 12 is a plan view schematically showing an example of the alignment pattern of the first liquid crystal molecules LM1 in the liquid crystal layer LC in the first area A1. FIG. 12 shows the alignment directions of the liquid crystal molecules LM11 that are close to the first main surface F1 among the first liquid crystal molecules LM1 contained in the first liquid crystal structure LMS1. In addition, illustration of the structures 20 is omitted in FIG. 12.

The liquid crystal molecules 11 are arranged along the X-direction and the Y-direction. The alignment directions of the liquid crystal molecules LM11 arranged in the X-direction are substantially coincident with each other. In other words, the spatial phases in the X-Y plane substantially match in the X-direction.

The alignment directions of the liquid crystal molecules LM11 arranged in the Y-direction are different from each other. In other words, the spatial phases in the X-Y plane are different along the Y-direction. For example, the alignment direction of each of the liquid crystal molecules LM11 changes continuously by a predetermined angle along the Y-direction (from left to right in FIG. 12). In this example, the amount of change in the alignment directions of the liquid crystal molecules LM11 is constant along the Y-direction, but may gradually increase or gradually decrease. As shown in FIG. 12, an interval between the liquid crystal molecules LM11 having a certain alignment direction and liquid crystal molecules LM11 having an alignment direction changed by 180 degrees with respect to that alignment direction is defined as an alignment pitch α.

For example, when the liquid crystal optical element 1 functions as a transmissive diffraction grating, the alignment pitch α is set to satisfy the following relationship where a wavelength of diffracted light is referred to as λ, an angle of incidence is referred to as θi, and an angle of diffraction of first-order diffracted light is referred to as θd1.

$$\alpha = \lambda / (\sin\theta d1 - \sin\theta i)$$

The alignment pitch α is, for example, 3 μm or less.

Next, a layout of the structure 20 for realizing the alignment pattern shown in FIG. 12 will be described. FIG. 13 is a plan view showing an example of a layout of the structures 20.

As described above, the plurality of structures 20 include the first structures 21 and the second structures 22. Each of the plurality of first structures 21 is formed in an arch shape which is convex toward the tip of the arrow pointing the X direction, in plan view. In addition, the plurality of first structures 21 are arranged at a first pitch P1 along the X-direction and are arranged at a second pitch P2 that is different from the first pitch P1 along the Y-direction. In this case, the first pitch P1 is a distance between vertices of the two first structures 21 arranged in the X-direction, and the second pitch P2 is a distance between vertices of the two first structures 21 arranged in the Y-direction. In one example, the second pitch P2 is larger than the first pitch P1. In addition, the second pitch P2 is larger than the distance La (i.e., the width of the second area A2) shown in FIG. 2. The second pitch P2 is equivalent to the alignment pitch α shown in FIG. 12.

The second structures 22 are provided between the structures 21 adjacent in the Y-direction, and are arranged at a pitch P22 along the Y-direction. In one example, the pitch P22 is equivalent to the second pitch P2, and the pitch P22 is equivalent to the alignment pitch α.

According to such a layout example, the alignment pattern of the liquid crystal molecules LM11 shown in FIG. 12 can be realized.

Incidentally, the number of second structures 22 provided between first structures 21 adjacent in the Y-direction may be two or more. In addition, instead of the arch-shaped first structures 21, a plurality of linear structures having mutually different extension directions may be applied.

Next, a specific configuration example of the first area A1 of the liquid crystal optical element 1 of each of the embodiments will be described.

(First Configuration Example)

FIG. 14 is a cross-sectional view schematically showing a first configuration example of the liquid crystal optical element 1. FIG. 14 corresponds to a cross-sectional view of the first area A1 of the liquid crystal optical element 1 along C-D line shown in FIG. 11. The first configuration example corresponds to an example in which the liquid crystal optical element 1 functions as a transmissive diffraction grating. The liquid crystal layer LC has the nematic liquid crystal which has the alignment direction aligned with the Z-direction. The alignment directions of the plurality of liquid crystal molecules LM11 arranged along the first main surface F1 change continuously along the Y-direction.

Incidentally, when the liquid crystal layer LC is a multi-layer body as described above, a part of the layer may be a nematic liquid crystal which is twist aligned.

When the refractive index anisotropy or birefringence of the liquid crystal layer LC is Δn (i.e., the difference between the refractive index ne of liquid crystal molecules for extraordinary light and the refractive index no of liquid crystal for ordinary light), the thickness of the liquid crystal layer LC is DLC, and the wavelength of the diffracted light is λ, the retardation Δn·DLC of the liquid crystal layer LC is desirably λ/2.

When one first liquid crystal structure LMS1 is focused, the alignment direction of the liquid crystal molecules LM11 and the alignment direction of the liquid crystal molecules LM12 are substantially coincide with each other. In addition, the alignment directions of the other first liquid crystal molecules LM1 between the liquid crystal molecule LM11 and the liquid crystal molecule LM12 are also substantially coincident with the alignment direction of the liquid crystal molecule LM11.

With respect to such a liquid crystal optical element 1, light may be made incident from the liquid crystal layer LC side or light may be made incident from the substrate 10 side. A case in which light is made incident from the liquid crystal layer LC side will be described. After transmitted through the liquid crystal optical element 1, incident light LTi is divided into 0-th-order diffracted light LT0 and first-order diffracted light LT1. Diffraction angle θd0 of the 0-th-order diffracted light LT0 is equivalent to the incident angle θi of the incident light LTi. Diffraction angle θd1 of the first-order diffracted light LT1 is different from the incident angle θi.

Second Configuration Example

FIG. 15 is a cross-sectional view schematically showing a second configuration example of the liquid crystal optical element 1. FIG. 15 corresponds to a cross-sectional view of the first area A1 of the liquid crystal optical element 1 along C-D line shown in FIG. 1. The second configuration example corresponds to an example in which the liquid crystal optical element 1 functions as a reflective diffraction grating. The liquid crystal layer LC2 contains cholesteric liquid crystal. To simplify the illustration, in FIG. 15, one first liquid crystal molecule LM1 represents a liquid crystal molecule facing in the average alignment direction, among the plurality of liquid crystal molecules provided in the X-Y plane. The alignment directions of the plurality of liquid crystal molecules LM11 arranged along the first main surface F1 change continuously along the Y-direction.

When one first liquid crystal structure LMS1 is focused, the plurality of first liquid crystal molecules LM1 are stacked in a spiral shape along the Z-direction while rotating. The alignment directions of the liquid crystal molecules LM11 are substantially coincident with the alignment directions of the liquid crystal molecules LM12. The first liquid crystal structure LMS1 has a helical pitch P. The helical pitch P indicates one period (360 degrees) of the spiral.

The liquid crystal layer LC has a plurality of reflective planes 13 as represented by one-dot chain lines. In one example, the plurality of reflective planes 13 are substantially parallel to each other. The reflective planes 13 are inclined to the first main surface F1 and have a substantially planar shape extending in a constant direction. The reflective planes 13 selectively reflect partial light LTr of the incident light LTi and transmit other light LTt, according to Bragg's law. The reflective planes 13 reflect light LTr according to the inclination angle φ of the reflective planes 13 with respect to the first main surface F1.

In the example shown in FIG. 15, the helical pitch P is shown as the distance along the Z-direction between the liquid crystal molecules LM11 and LM12. The thickness DLC of the layer LC is desirably 5 times or more, more desirably 10 times or more as large as the helical pitch P from the viewpoint of improving the reflectance on the reflective planes 13.

The reflective plane 13 corresponds to a plane in which the alignment directions of the first liquid crystal molecules LM1 are arranged or a plane (an equiphase plane) in which the spacial phases are arranged. Incidentally, the shape of the reflective plane 13 is not limited to the plane shape, and may be a curved shape such as a concave shape or a convex shape, and is not particularly limited. Part of the reflective plane 13 may be convex or concave, the inclination angles φ of the reflective plane 13 may not be uniform, or the plurality of reflective planes 13 may not be regularly aligned. The reflective planes 13 having any shapes can be formed in accordance with the distribution of the spacial phases of the first liquid crystal structure LMS1.

The cholesteric liquid crystal that is the first liquid crystal structure LMS1 reflects circularly polarized light in the same turning direction as the turning direction of the cholesteric liquid crystal, of the light of a predetermined wavelength λ included in the selective reflection range Δλ. For example, when the turning direction of the cholesteric liquid crystal is right-handed, the cholesteric liquid crystal reflects right-handed circularly polarized light, of the light having the predetermined wavelength λ, and transmits left-handed circularly polarized light. Similarly, when the turning direction of the cholesteric liquid crystal is left-handed, the cholesteric liquid crystal reflects left-handed circularly polarized light, of the light having the predetermined wavelength λ, and transmits right-handed circularly polarized light.

When the helical pitch of the cholesteric liquid crystal is referred to as P, the refractive index of the liquid crystal molecules to extraordinary light is referred to as ne, and the refractive index of the liquid crystal molecules to ordinary light is referred to as no, a selective reflection band range of the cholesteric liquid crystal to the vertically incident light is generally referred to as "no*P to ne*P". More specifically, the selective reflection band range Δλ of the cholesteric liquid crystal changes in accordance with the inclination angle φ of the reflective planes 13, the incident angle θi, and the like, with respect to the range "no*P to ne*P".

Incidentally, the liquid crystal layer LC may be a single-layer body or a multilayer body. When the liquid crystal layer LC is a multilayer body, liquid crystal layers having different helical pitches may be stacked or liquid crystal layers having spiral turning directions opposite to each other may be stacked. Alternatively, when the liquid crystal layer LC is a single layer, the liquid crystal layer LC may be a liquid crystal layer in which the helical pitch changes continuously.

According to each of the embodiments described above, the first liquid crystal molecules LM1 provided in the first area A1 are aligned along the structures 20, and the liquid crystal optical element 1 functions as the diffraction grating. In addition, the second liquid crystal molecules LM2 provided in the second area A2 are uniformly aligned in the same direction. For this reason, the second area A2 transmits the incident light as it is or reflects the incident light in a predetermined direction. In other words, undesired light scattering in the second area A2 can be suppressed.

In addition, clouding of the liquid crystal layer LC in the second area A2 can be suppressed and deterioration of the appearance of the liquid crystal optical element 1 can be suppressed.

(Method of Manufacturing Liquid Crystal Optical Element 1)

Next, a method of manufacturing the liquid crystal element 1 of the embodiments will be described. In this case, an example of a method of manufacturing the liquid crystal optical element 1 of the first embodiment shown in FIG. 2 will be described.

Figure 16:
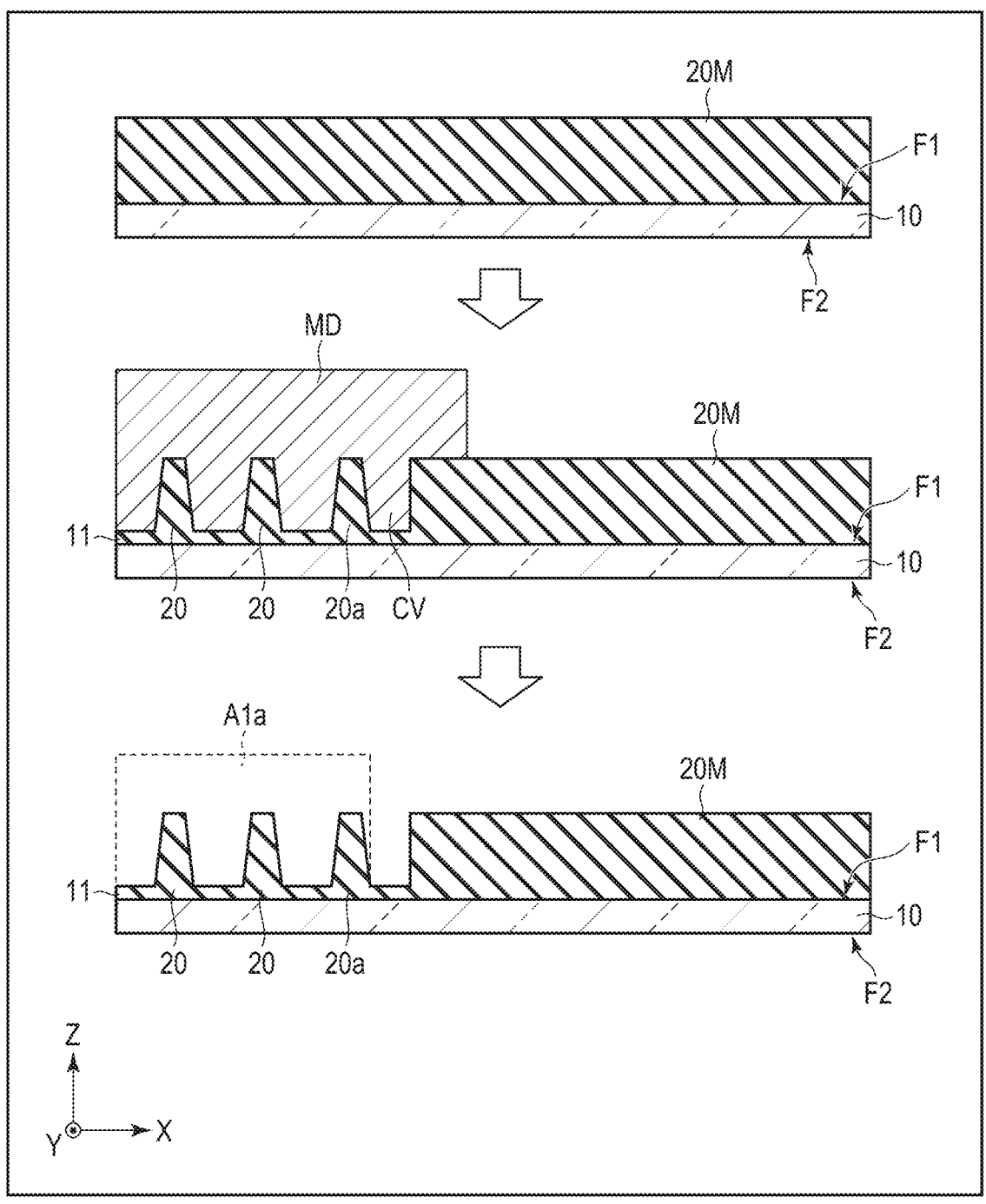
FIG. 16 is a diagram illustrating an example of a method of manufacturing the liquid crystal optical element 1.
Figure 17:
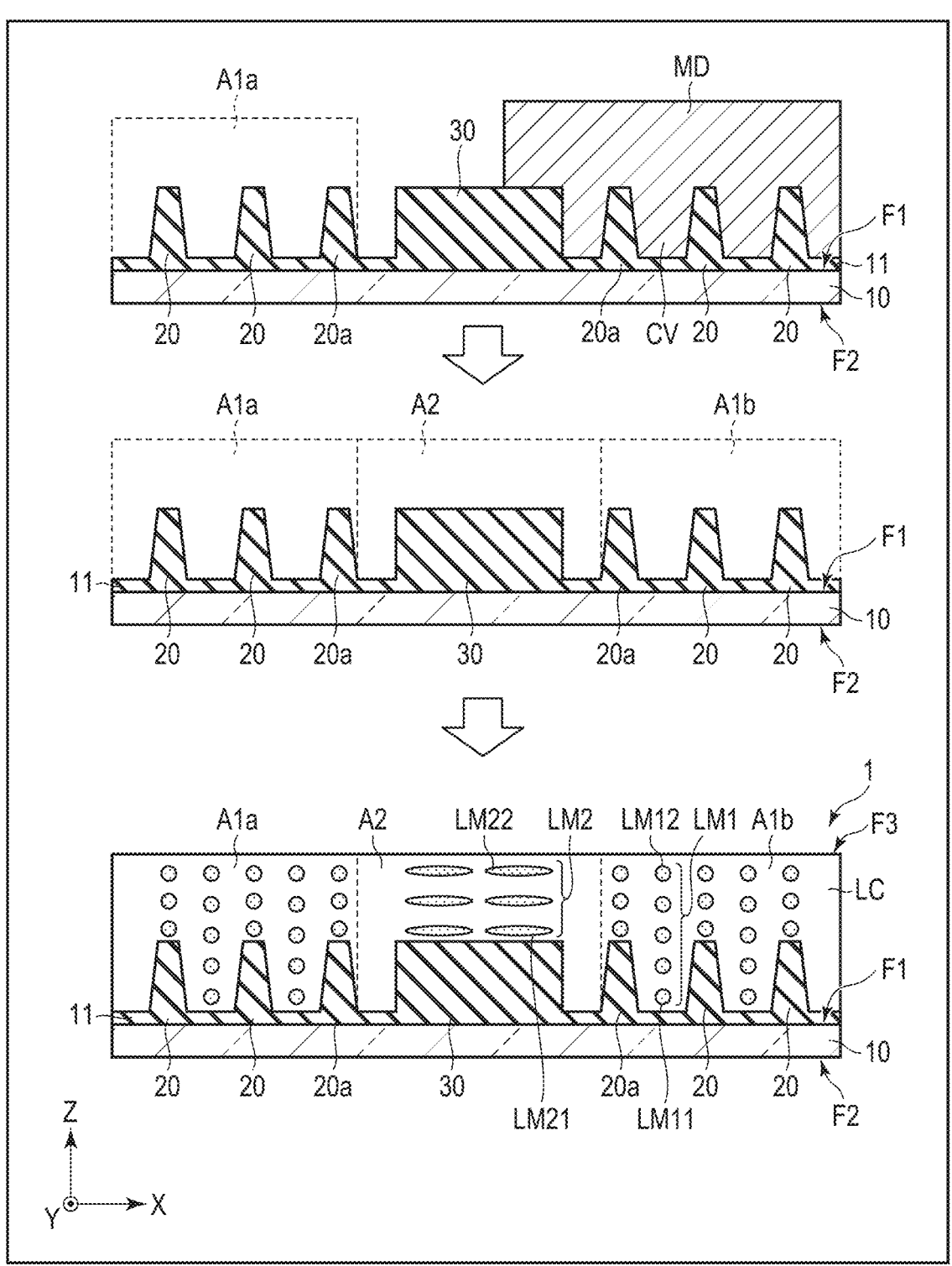
FIG. 17 is a diagram illustrating an example of a method of manufacturing the liquid crystal optical element 1.

FIG. 16 and FIG. 17 are diagrams illustrating an example of a method of manufacturing the liquid crystal optical element 1 of the first embodiment shown in FIG. 2.

First, as shown in the upper part of FIG. 16, a transparent structure material 20M for forming the structure 20 is applied to the first main surface F1 of the substrate 10, and the solvent is removed to form the structure material 20M in a temporarily cured state. An ultraviolet curable resin can be used as the structure material 20M. Incidentally, if an ultraviolet curable resin having a property of vertically aligning liquid crystal molecules is used as the structure material 20M, an alignment treatment to be described in detail later is unnecessary.

Next, as shown in the middle part of FIG. 16, a first stamping process is performed. First, a mold MD in which uneven portions corresponding to the shape of the structure 20 are formed is prepared. Then, the surface to which the structure material 20M is applied and the mold MD are opposed to each other, the mold MD is made to overlap with the structure material 20M, and ultraviolet rays are applied while pressing. As a result, the portion of the structure material 20M where the mold MD is made to overlap is cured into a shape corresponding to the unevenness of the mold MD.

In the example shown in FIG. 16, ultraviolet rays are applied in a state in which the structure material 20M is interposed between a convex portion CV of the mold MD and the first main surface F1. For this reason, the first main surface F1 is covered with the thin film 11 formed of the same material as the structure 20. Incidentally, the ultraviolet rays may be applied in a state in which the convex portion CV of the mold MD is in contact with the first main surface F1. In this case, the formed structures 20 are separated from each other, and the first main surface F1 is exposed between the adjacent structures 20.

After that, as shown in the lower part of FIG. 16, when the mold MD is removed, the structure 20 of the first area A1a is formed.

Next, as shown in the upper part of FIG. 17, a second stamping process is performed. The mold MD is moved to an area different from the first area A1a, the surface to which the structure material 20M is applied and the mold MD are opposed to each other, the mold MD is made to overlap with the structure material 20M, and ultraviolet rays are applied while pressing.

After that, as shown in the middle part of FIG. 17, when the mold MD is removed, the structure 20 of the second first area A1b and the partition 30 of the second area A2 are formed. In addition, the first main surface F1 of the second area A2 is covered with the thin film 11 formed of the same material as the structure 20.

Incidentally, the thin film 11 in the second area A2 may be exposed or the first main surface F1 in the second area A2 may be exposed, by removing the partition 30. Alternatively, the first main surface F1 may be exposed by removing the thin film 11 between the adjacent structures 20.

After that, by repeating the same stamping process, the structure 20 can be formed on the first main surface F1 of the large-area substrate 10.

Although not shown, after forming the structure 20, the alignment film 12 may be formed in at least the second area A2, as described in the fifth to eighth embodiments shown in FIG. 7 to FIG. 10, respectively. The alignment film 12 is formed in, for example, the following manner. First, an alignment film material is applied to a desired surface of the substrate 10 on which the structure 20 has already been formed. Then, the alignment film material is cured by drying or the like to form the alignment film 12.

Next, an alignment process is performed on at least the second area A2.

After the alignment treatment is performed, the liquid crystal layer LC is formed over the first areas A1a and A1b and the second area A2 as shown in the lower part of FIG. 17. The liquid crystal layer LC is formed in, for example, the following manner. First, a liquid crystal material is applied over the first areas A1a and A1b and the second area A2. Then, in a state in which the liquid crystal molecules contained in the liquid crystal material are aligned in a predetermined direction in the first areas A1a and A1b and the second area A2, the liquid crystal material is cured by applying light such as ultraviolet rays, thereby forming the liquid crystal layer LC.

The alignment directions of the liquid crystal molecules contained in the liquid crystal material, i.e., the first liquid crystal molecules LM1 in the first areas A1a and A1b and the second liquid crystal molecules LM2 in the second area A2 will be described below.

The alignment directions of the first liquid crystal molecules LM1 are fixed as follows before the liquid crystal material is cured.

The liquid crystal molecules LM11 close to the thin film 11 are horizontally aligned along the X-Y plane between adjacent structures 20, and are aligned such that their long axes are aligned along the tangents of the structures 20. The alignment directions of the first liquid crystal molecules LM1 that overlap with the liquid crystal molecules LM11 in the Z direction are determined according to the alignment directions of the liquid crystal molecules LM11. The first liquid crystal molecules LM1 provided above the structures 20 are aligned to follow the first liquid crystal molecules LM1 in their surroundings.

In the example shown in FIG. 17, the alignment directions of the first liquid crystal molecules LM1 overlapping with the liquid crystal molecules LM11 are substantially the same as the alignment directions of the liquid crystal molecules LM11. However, if a chiral agent is added to the liquid crystal material, a plurality of first liquid crystal molecules LM1 overlap in the Z-direction while turning with respect to the liquid crystal molecules LM11.

The alignment directions of the second liquid crystal molecules LM2 are fixed as follows before the liquid crystal material is cured.

The liquid crystal molecules LM21 close to the top portion 30T of the partition 30 are uniformly aligned in the same direction due to the alignment restriction force applied to the top portion 30T by the alignment treatment. The alignment directions of the second liquid crystal molecules LM2 that overlap with the liquid crystal molecules LM21 in the Z-direction are determined according to the alignment directions of the liquid crystal molecules LM21.

In the example shown in FIG. 17, the alignment directions of the second liquid crystal molecules LM2 overlapping with the liquid crystal molecules LM21 are substantially the same as the alignment directions of the liquid crystal molecules LM21. If a chiral agent is added to the liquid crystal material, a plurality of second liquid crystal molecules LM2 overlap in the Z-direction while turning with respect to the liquid crystal molecules LM21.

Thus, each of the alignment directions of the first liquid crystal molecules LM1 and the second liquid crystal molecules LM2 is fixed according to the alignment directions of the liquid crystal molecules LM11 in the first area A1 and the liquid crystal molecules LM21 in the second area A2. After that, the process of curing the liquid crystal material is performed.

The alignment treatment of the liquid crystal optical element 1 of each of the embodiments will be described in detail.

In the first to third embodiments that do not comprise an alignment film, the alignment treatment is performed on at least any of the following portions (a), (b), and (c):

(a) the top portion 30T of the partition 30 when the liquid crystal optical element 1 comprises the partition 30;

(b) the thin film 11 in the second area A2 when the liquid crystal optical element 1 does not comprise the partition 30 but comprises the thin film 11; and (c) the first main surface F1 of the second area A2 when the liquid crystal optical element 1 does not comprise the partition 30 or the thin film 11.

In the fifth to eighth embodiments comprising the alignment film 12, the alignment treatment is performed on at least the alignment film 12 in the second area A2.

The rubbing treatment can be employed as an example of alignment treatment. At this time, not only the second area A2, but the first area A1 may be subjected to the rubbing treatment. When the first area A1 is subjected to the rubbing treatment, the azimuthal anchoring energy at the interface between the surface which is subjected to the alignment treatment and the liquid crystal layer LC is desirably made smaller than the azimuthal anchoring energy generated by the structures 20. As a result, even when the first area A1 is subjected to the rubbing treatment, the first liquid crystal molecules LM1 are hardly affected by the rubbing treatment and are aligned along the structures 20. In contrast, the second liquid crystal molecules LM2 located in the second area A2 are uniformly aligned in the direction of performing the rubbing treatment.

In general, each fiber of the rubbing cloth used in the rubbing treatment has a diameter of several to several tens of micrometers. The distance L1 between adjacent structures 20 is desirably smaller than the diameter of the fiber. As a result, even if the first area A1 is subjected to the rubbing treatment, the fibers of the rubbing cloth may not enter between the adjacent structures 20, and the rubbing process may not be performed. Therefore, the influence of the rubbing treatment on the alignment directions of the first liquid crystal molecules LM1 can be further suppressed.

In contrast, the distance La between the structures 20a located at the outermost periphery of the first area A1, i.e., the width of the second area A2 is larger than the diameter of the fiber. For this reason, the rubbing treatment in the second area A2 is realized.

The alignment treatment of the alignment film 12 can also be performed by photo-alignment treatment.

The photo-alignment treatment is realized by, for example, applying linearly polarized ultraviolet light. The photo-alignment treatment is performed on at least the second area A2, but may be performed not only in the second area A2 but also in the first area A1. When the photo-alignment treatment is performed in the first area A1 and the second area A2, it is preferable that the irradiation intensity of ultraviolet rays be desirably adjusted such that the azimuthal anchoring energy in the first area A1 is smaller than the azimuthal anchoring energy in the second area A2. In addition, when the photo-alignment treatment is performed in the first area A1, it is preferable that the azimuthal anchoring energy at the interface between the photo-aligned alignment film 12 and the liquid crystal layer LC be set to be smaller than the azimuthal anchoring energy generated by the structure 20. By doing this, the first liquid crystal molecules LM1 located in the first area A1 are hardly affected by the photo-alignment treatment and are aligned along the structures 20. In contrast, the second liquid crystal molecules LM2 located in the second area A2 are uniformly aligned in the direction defined by the photo-alignment treatment.

Alternatively, only the alignment film 12 provided in the second area A2 may be subjected to the photo-alignment treatment by shielding the first area A1 from light. Thus, the influence of the photo-alignment treatment on the alignment directions of the first liquid crystal molecules LM1 can be suppressed.

According to the method of manufacturing the liquid crystal optical element 1 described above, the minute structures 20 can easily be formed using the mold MD having minute concave and convex on the wavelength order. Such a structure 20 has a function of defining the alignment directions of the first liquid crystal molecules LM1 contained in the liquid crystal material applied to the first area A1. In addition, since the surface of the second area A2 which is in contact with the liquid crystal layer LC has an alignment restriction force in one direction, the second liquid crystal molecules LM2 can be uniformly aligned in the same direction, and the light scattering in the second area A2 can be suppressed. Therefore, liquid crystal optical elements 1 capable of suppressing the decrease in diffraction efficiency and having good appearance can be mass-produced.

As described above, according to each of the embodiments, a liquid crystal optical element capable of suppressing undesired light scattering can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:
a substrate having a first main surface;
a plurality of structures arranged at a predetermined pitch in each of a plurality of first areas provided in a first direction and a second direction intersecting the first direction on the first main surface; and
a liquid crystal layer provided over the plurality of first areas and a second area surrounding each of the plurality of first area, wherein
the liquid crystal layer contains first liquid crystal molecules provided between the adjacent structures and arranged along the structures, in the first areas, and second liquid crystal molecules with their long axes arranged in a uniform direction, in the second area, and is cured in a state in which alignment directions of the first liquid crystal molecules and the second liquid crystal molecules remain fixed irrespective of the electric field, and
the first liquid crystal molecules and the second liquid crystal molecules are arranged such that, in a third direction orthogonal to the first and the second directions, they do not overlap an electrode for alignment control.

2. The liquid crystal optical element of claim 1, wherein a width of the second area is larger than the predetermined pitch.

3. The liquid crystal optical element of claim 1, further comprising:
a partition provided on the first main surface in the second area, surrounding the first area, and formed of the same material as the structures, wherein
a width of the partition is larger than a width of the structures.

4. The liquid crystal optical element of claim 1, further comprising:
a thin film provided between the structures in the first area and covering the first main surface, wherein
the thin film is formed of the same material as the structures.

5. The liquid crystal optical element of claim 1, further comprising:
an alignment film provided between the liquid crystal layer and the substrate in the second area and being in contact with the liquid crystal layer.

6. The liquid crystal optical element of claim 5, further comprising:
an alignment film provided between the liquid crystal layer and the substrate in the first area and being in contact with the liquid crystal layer.

7. The liquid crystal optical element of claim 1, wherein the plurality of structures include a plurality of first structures in an arch shape, wherein the plurality of first structures are arranged at a first pitch along the first direction and are arranged at a second pitch larger than the first pitch along the second direction.

8. The liquid crystal optical element of claim 7, wherein the plurality of structures further include at least one second structure provided between the first structures adjacent in the second direction, and the second structure extends linearly along the first direction.

9. The liquid crystal optical element of claim 7, wherein long axes of the first liquid crystal molecules located between the adjacent first structures are aligned along tangents of the first structures, and long axes of the second liquid crystal molecules are aligned in a direction substantially parallel to or substantially vertical to the first main surface of the substrate.

10. The liquid crystal optical element of claim 1, wherein the liquid crystal layer contains nematic liquid crystal with alignment directions aligned in the first area.

11. The liquid crystal optical element of claim 1, wherein the liquid crystal layer contains cholesteric liquid crystal in the first area.

12. The liquid crystal optical element of claim 1, wherein the liquid crystal layer has a first main surface facing the substrate and a second main surface opposite thereto, and the second main surface is in contact with air.

13. The liquid crystal optical element of claim 1, wherein the liquid crystal optical element does not comprise an electrode for alignment control.

* * * * *